US011743600B2

(12) United States Patent
Lu

(10) Patent No.: US 11,743,600 B2
(45) Date of Patent: Aug. 29, 2023

(54) MULTIPLE-PROCESSOR SYSTEM FOR MULTIPLE-LENS CAMERA AND METHOD THEREOF

(71) Applicant: ASPEED Technology Inc., Hsinchu (TW)

(72) Inventor: Chung-Yen Lu, Hsinchu (TW)

(73) Assignee: ASPEED TECHNOLOGY INC., Hsinchu (TW)

( * ) Notice: Subject to any disclaimer, the term of this patent is extended or adjusted under 35 U.S.C. 154(b) by 79 days.

(21) Appl. No.: 17/400,452

(22) Filed: Aug. 12, 2021

(65) Prior Publication Data

US 2023/0056183 A1 Feb. 23, 2023

(51) Int. Cl.
H04N 23/80 (2023.01)
G06T 1/20 (2006.01)
G06T 5/40 (2006.01)
G06T 3/00 (2006.01)
H04N 23/698 (2023.01)

(52) U.S. Cl.
CPC ............... *H04N 23/80* (2023.01); *G06T 1/20* (2013.01); *G06T 3/0093* (2013.01); *G06T 5/40* (2013.01); *H04N 23/698* (2023.01)

(58) Field of Classification Search
CPC ........... H04N 5/23229; H04N 5/23238; H04N 5/3415; H04N 2013/0088; G06T 1/20; G06T 3/0093; G06T 5/40
See application file for complete search history.

(56) References Cited

U.S. PATENT DOCUMENTS

| 7,623,131 | B1* | 11/2009 | Johnson | G06T 1/20 345/503 |
|---|---|---|---|---|
| 8,698,816 | B2 | 4/2014 | Johnson | |
| 9,402,018 | B2 | 7/2016 | Neglur | |
| 10,516,824 | B2 | 12/2019 | Jeon | |
| 10,810,700 | B2 | 10/2020 | Lu | |
| 10,848,731 | B2* | 11/2020 | Simek | H04N 5/265 |
| 11,288,850 | B1* | 3/2022 | Nystad | G06T 1/20 |
| 2007/0300041 | A1* | 12/2007 | Eckert | G06T 1/20 712/10 |
| 2008/0235490 | A1 | 9/2008 | Jones et al. | |
| 2015/0049094 | A1* | 2/2015 | Yan | G06T 1/20 345/502 |
| 2018/0227484 | A1* | 8/2018 | Hung | G06T 3/0093 |
| 2020/0077070 | A1 | 3/2020 | Takahashi et al. | |
| 2020/0286206 | A1* | 9/2020 | Lu | H04N 5/23238 |
| 2021/0400193 | A1* | 12/2021 | Ma | H04N 5/23229 |
| 2021/0405518 | A1* | 12/2021 | Lablans | H04N 13/296 |

FOREIGN PATENT DOCUMENTS

CN 101064773 A 10/2007

* cited by examiner

*Primary Examiner* — Fernando Alcon
(74) *Attorney, Agent, or Firm* — Muncy, Geissler, Olds & Lowe, P.C.

(57) ABSTRACT

A multiple-processor system for a multiple-lens camera is disclosed. The system comprises multiple processor components (PCs) and multiple links. Each PC comprises multiple I/O ports and a processing unit. The multiple-lens camera captures a X-degree horizontal field of view and a Y-degree vertical field of view, where X<=360 and Y<180. Each link conjects one of the I/O ports of one of the PCs to one of the I/O ports of another one of the PCs such that each PC is conjected by two or more respective links to one or two neighboring PCs. Each link is configured to transfer data in one direction.

27 Claims, 19 Drawing Sheets

Two-lens camera polygon mesh on equirectangular projection domain

Triangle mesh modeling a sphere

MULTIPLE-PROCESSOR SYSTEM FOR MULTIPLE-LENS CAMERA AND METHOD THEREOF

BACKGROUND OF THE INVENTION

Field of the Invention

The invention relates to image processing, and more particularly, to a multiple-processor system for a multiple-lens camera and method thereof.

Description of the Related Art

Conventionally, a centralized processor system for processing image data from a multiple-lens camera was once the dominant computer architecture. The centralized processor system provides advantages such as reduced hardware costs and reduced power consumption. However, as cameras increasingly capture higher resolution images and/or videos and have more lenses, a downside for the centralized processor system to providing such cameras is the fact that processing images can be expensive in terms of computation resources, memory bandwidths, computation speeds and processing performance. Accordingly, what is needed is a new architecture and method to address the above-identified problems. The invention addresses such a need.

SUMMARY OF THE INVENTION

In view of the above-mentioned problems, an object of the invention is to provide a multiple-processor system for a multiple-lens camera, to thereby increase memory bandwidths and computation speeds and improve processing performance.

One embodiment of the invention provides a multiple-processor system. The system comprises multiple processor components (PCs) and multiple links. The PCs are coupled to a multiple-lens camera that captures a X-degree horizontal field of view and a Y-degree vertical field of view. each PC comprises multiple I/O ports and a processing unit. Each link conjects one of the I/O ports of one of the PCs to one of the I/O ports of another one of the PCs such that each PC is conjected by two or more respective links to one or more neighboring PCs. Each link is configured to transfer data in one direction, where $X<=360$ and $Y<180$.

Another embodiment of the invention provides an image processing method, applied to a multiple-processor system for a multiple-lens camera that captures a X-degree horizontal field of view and a Y-degree vertical field of view. The multiple-processor system comprises multiple processor components (PCs) and multiple links. Each PC is conjected by two or more respective links to one or two neighboring PCs and each link is configured to transfer data in one direction. The method comprises: at a PC j, obtaining $n_j$ lens images captured by the multiple-lens camera; selectively transceive inbound and outbound first edge data associated with the $n_j$ lens images and zero or more responsible overlap regions to and from the one or two neighboring PCs in a first transmission stage; determining optimal warping coefficients for responsible control regions in the responsible overlap regions according to a first vertex sub-list, the $n_j$ lens images and the inbound first edge data; selectively transceiving inbound and outbound warping coefficients to and from the one or two neighboring PCs in a second transmission stage; and, rendering $n_j$ face images according to the first vertex sub-list, the optimal and the inbound warping coefficients, the inbound first edge data and the $n_j$ lens images, where $n_j>=1$, $X<=360$ and $Y<180$. Here, the outbound warping coefficients are selected from the optimal warping coefficients according to the responsible control regions, and the first vertex sub-list comprises multiple first vertices with first data structures that define a first vertex mapping between the $n_j$ lens images and a projection image related to all the face images from all the GPUs.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
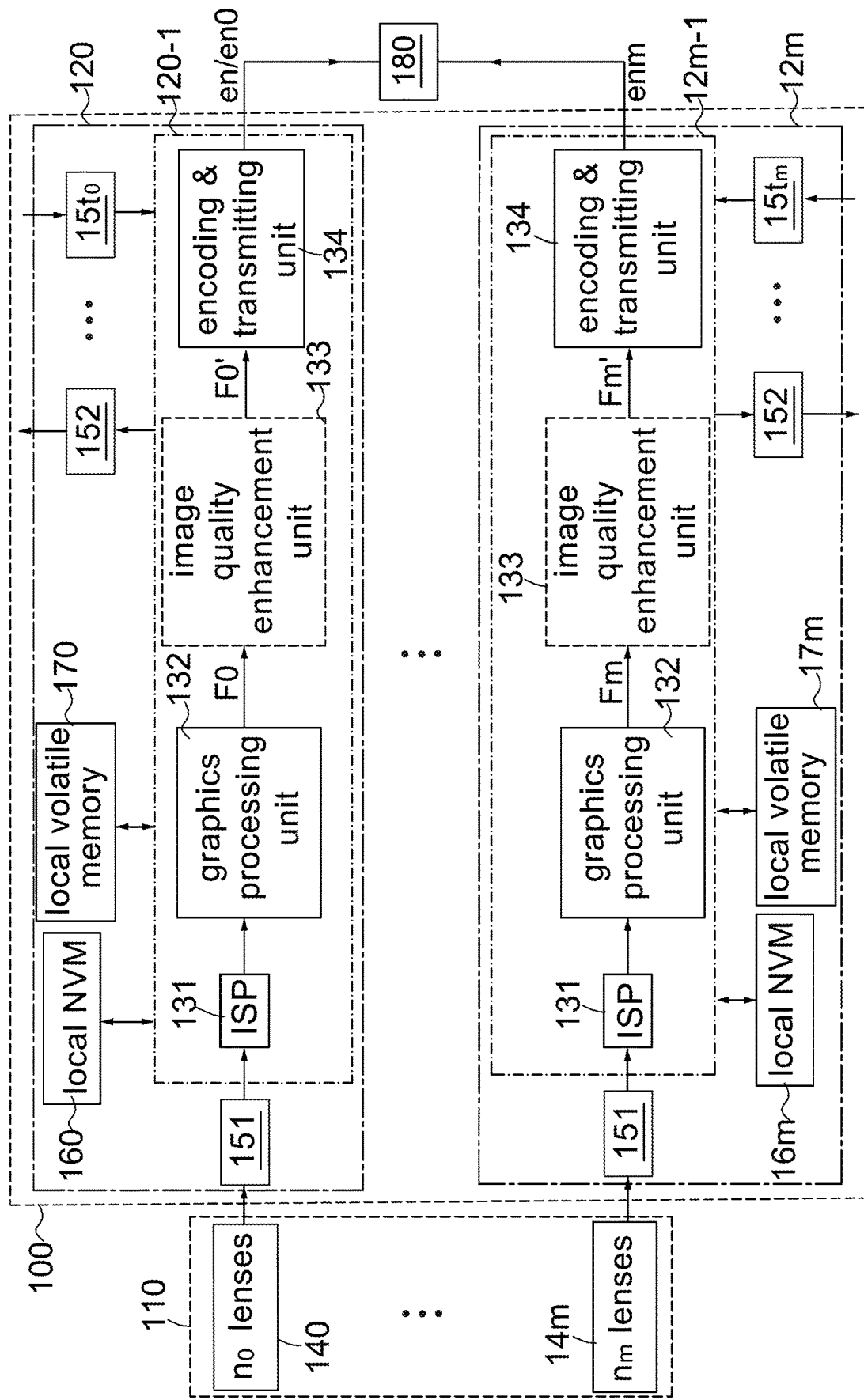
FIG. 1 is a diagram of a multiple-processor system for a multiple-lens camera according to the invention.

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context. Throughout the specification, the same components with the same function are designated with the same reference numerals.

A feature of the invention is to use a multiple-processor architecture to process image data from a multiple-lens camera to make full use of computation resources, increase memory bandwidths and computation speeds and improve processing performance.

FIG. 1 is a block diagram of a multiple-processor system for a multiple-lens camera according to the invention. Referring to FIG. 1, the multiple-processor system 100, configured to process image data from a multiple-lens camera 110, includes a main processor component (PC) 120, m auxiliary PCs 121~12m and multiple links (shown in FIGS. 4A/8/9A), where m>=1. The lenses of the camera 110 are divided into (m+1) lens groups 140~14m that are respectively coupled to the main PC 120 and the m auxiliary PCs 12m via I/O ports 151, where $n_0, \ldots, n_m \geq 1$. According to the invention, the PC 12j may be implemented using an integrated circuit devices such as programmable processor, an application-specific integrated circuit (ASIC) and a dedicated processor component, where $0\leq j\leq m$. In an embodiment, the multiple-processor system 100/400/800/900 can be any system on a chip (SoC) to be integrated into a computing device (e.g., a mobile phone, tablet computer, wearable computer, etc.) to perform at least a portion of the imaging processing of captured images or video by the camera 110.

Figure 2A:
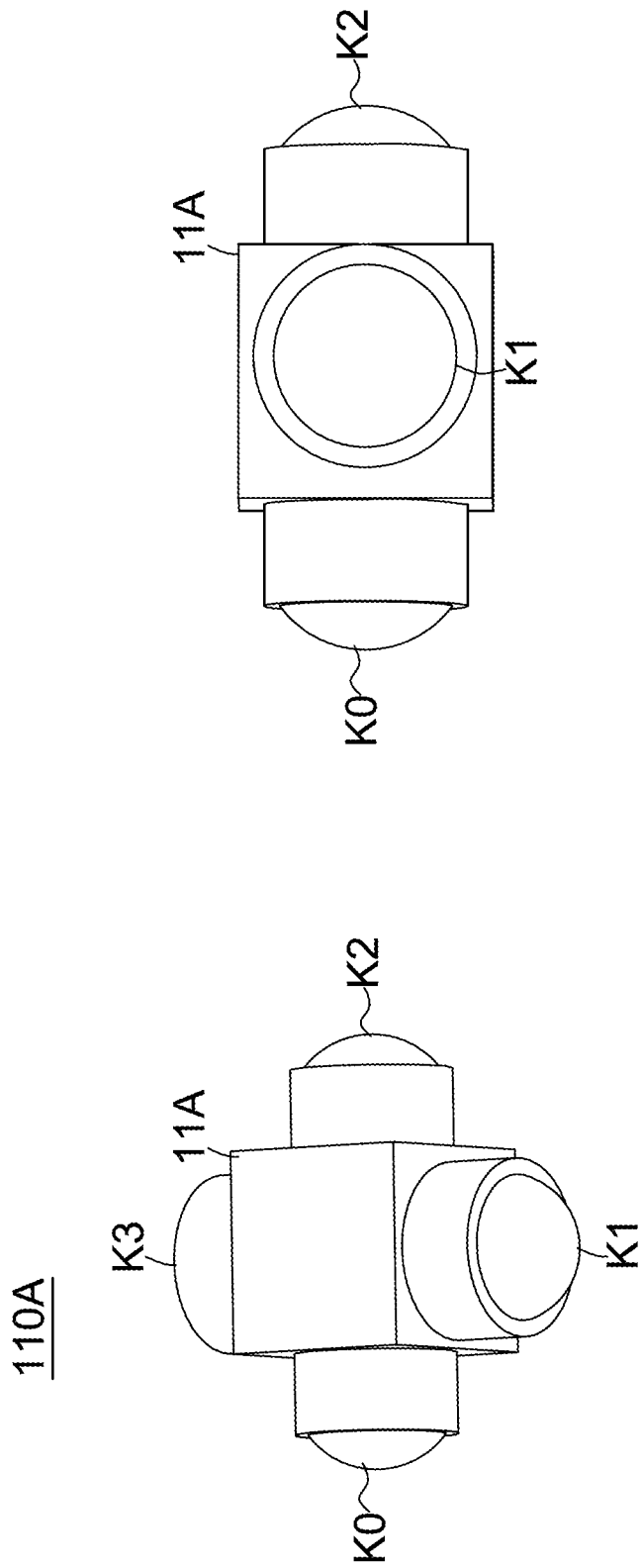
FIG. 2A shows two different side views of a four-lens camera.
Figure 2B:
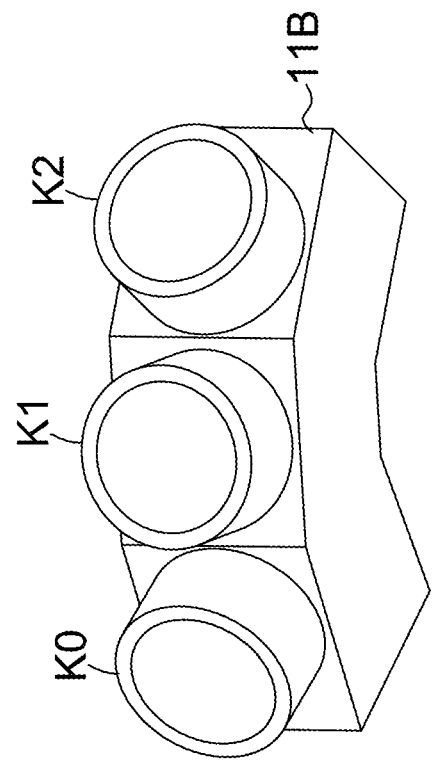
FIG. 2B shows two different side views of a three-lens camera.
Figure 2B:
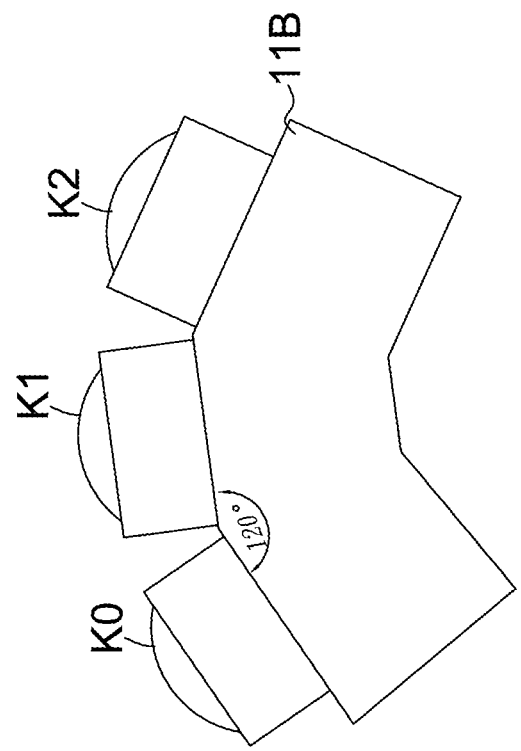
Figure 2C:
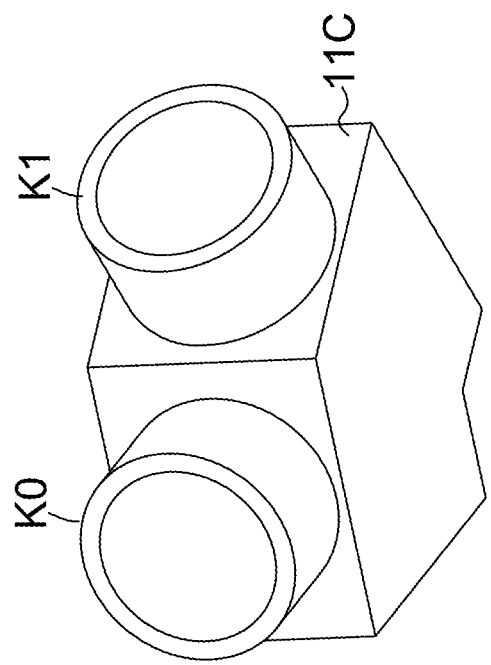
FIG. 2C shows two different side views of a two-lens camera.
Figure 2C:
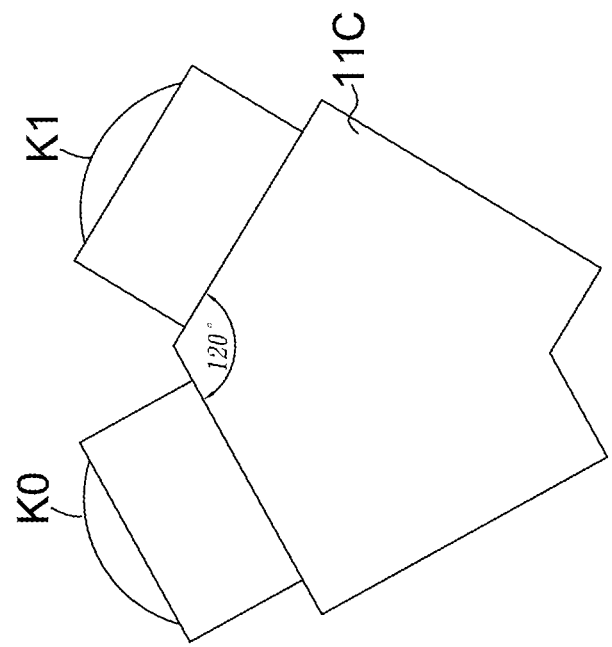

The camera 110 may capture a still image or moving images. The multiple-lens camera 110 may be a panoramic camera (e.g., a four-lens camera 110A FIG. 2A) or a wide-angle camera (e.g., a three-lens camera 110B and a two-lens camera 110C in FIGS. 2B-2C), and correspondingly a receiver 180 receives the encoded video stream(s) (en or en0~enm) from the system 100 to form a projection image, which may be a wide-angle image or a panoramic image. In FIGS. 2B-2C, two rims/faces of a framework 11B/C of the camera 110B/C, where the two lenses K0 and K1 are mounted, form an angle of 120 degrees. Please note that the angle of 120 degrees is provided by example, but not limitations of the invention. In actual implementation, the two rims/faces of the framework 11B/C may form any other angle. The multiple-lens camera 110 is capable of simultaneously capturing a view with a X-degree horizontal field of view (FOV) and a Y-degree vertical FOV to generate a plurality of lens images, where X<=360 and Y<180, e.g., 360×160 or 180×90. For example, for the camera 110A in FIG. 2A, its four lenses (not shown) are respectively mounted on the four faces of the cube framework 11A to simultaneously capture a view of the world with 360-degree horizontal FOV and 90-degree vertical FOV to generate four lens images. Please note that the number of the lenses in the camera 110 is not limited as long as it is sufficient for the lenses to capture a view with a X-degree horizontal FOV and a Y-degree vertical FOV, where X<=360 and Y<180. A requirement is that there should be sufficient overlaps between the FOVs of any two adjacent lenses to facilitate image mosaicking.

Each PC 12j includes a processing unit 12j-1, a local non-volatile memory (NVM) 16j, a local volatile memory (VM) 17j and multiple I/O ports $151{\sim}15t_j$, where $0\leq j\leq m$ and $t_j\geq 3$. Each PC 12j operates with its own local NVM 16j and local VM 17j. Please note that the number $t_j$ of the I/O ports for each PC 12j is varied depending on whether the main PC 120 merges the face/enhanced images from the auxiliary PCs, the number m, the type of camera (i.e., wide-angle or panoramic), the type of the PC 12j (i.e., main or auxiliary) and the position relative to the main PC 120. The I/O ports $151{\sim}15t_j$ may be of generally conventional design and may include circuits that modify data to conform to a high-speed serial interface standard, such as mobile industry processor interface (MIPI). The following embodiments are described with the assumption that the I/O ports $151{\sim}15t_j$ are MIPI ports. It should be understood, however, that the I/O ports $151{\sim}15t_j$ are not limited to the MIPI ports, but fully extensible to any existing or yet-to-be developed high-speed serial interface standard. Each of the I/O ports $151{\sim}15t_j$ are each configurable as either an input MIPI port or an output MIPI port. Each link conjects one of the I/O ports of one of the PCs to one of the I/O ports of another one of the PCs.

Each processing unit 12j-1 includes an image signal processor (ISP) 131, a graphics processing unit (GPU) 132, an image quality enhancement (IQE) unit 133 and an encoding & transmitting unit 134. Please note that the IQE units 133 are optional, and thus represented by dashed lines in FIG. 1. The local volatile memories (VM) 170~17m are used to store various data used by the processing units 120-1~12m-1. The various data may include, for example, the programs, or the image data obtained from the camera 110. The local non-volatile memories (NVM) 160~16m include a plurality of programs or instructions that are respectively executed by the processing units 120-1~12m-1 to perform all the steps of the methods of FIGS. 4B-4C and 7A-7B, as will be described in greater detail below. In addition, the processing unit 120-1 executes the programs stored in the local NVM 160 to perform various data processing or computation over the image data acquired from the no lenses 140 of the camera 110 and stored in the VM 170, and to control the overall operations of the multiple-processor system 100, including controlling the camera 110 and the m auxiliary PCs 121~12m. Each processing unit 12j-1 in each auxiliary PC 12j is operated separately from the main PC 120 and executes the programs stored in the local NVM 16j to perform various data processing or computation over the image data acquired from the $n_j$ lenses 14j of the camera 110 and stored in the VM 17j, where $1\leq j\leq m$. Specifically, the ISPs 131 respectively receive the electronic signals from image sensors (not shown) of corresponding lens groups 14j in the camera 110 via respective input ports 151 and transform the electronic signals into digital lens images. The GPUs 132 respectively execute the programs stored in the local NVMs 160~16m to determine optimal warping coefficients and perform rasterization, texture mapping and blending operations to form a main face image F0 and m auxiliary face images (F1~Fm) according to multiple lens images, original and modified main vertex sub-lists, m original and m modified AUX vertex sub-lists (will be described below). The IQE units 133 perform contrast enhancement, lowpass filtering and sharpness operations over the main face image F0 and m auxiliary face images (F1~Fm) to generate a main enhanced image F0' and m auxiliary enhanced images (F1'~Fm'). Finally, the encoding & transmitting units 134 in the PCs 120~12$m$ respectively encode the main enhanced image F0' and m auxiliary enhanced images (F1'~Fm') into (m+1) encoded video stream en0~enm, and then transmit the (m+1) encoded video streams en0~enm to a receiver 180 for generation of either a panoramic image or a wide-angle image.

Through the specification and claims, the following notations/terms take the meanings explicitly associated herein, unless the context clearly dictates otherwise. The term "texture coordinates" refers to coordinates in a texture space (such as a lens/texture image). The term "rasterization" refers to a process of computing the mapping from scene geometry (or a projection image) to texture coordinates of each lens image. The term "transceive" refers to transmit and/or receive. The term "projection" refers to flatten a globe's surface into a 2D plane, e.g., a projection image.

A wide variety of projections are suitable for use in the multiple-processor system 100 of the invention. The projection includes, without limitations, equirectangular projection, cylindrical projection and modified cylindrical projection. The modified cylindrical projection includes, without limitations, Miller projection, Mercator projection, Lambert cylindrical equal area projection and Panjini projection. Thus, the projection image includes, without limitations, an equirectangular panoramic image, a cylindrical projection image and a modified cylindrical projection image. FIGS. 3B-3D are associated with equirectangular projection. The implementations of the cylindrical projection and the modified cylindrical projection are well known to those skilled in the art and thus will not be described herein.

For purpose of clarity and ease of description, the following examples and embodiments are described with reference to equirectangular projection and equirectangular panoramic images, and with the assumption that the panoramic camera 110A has four lenses K0~K3 respectively mounted on the four faces (left, right, front and back) of the cube framework 11A. The operations of the multiple-processor system 100 are generally applicable to the wide-angle camera, the cylindrical projection and the modified cylindrical projection.

Figure 3A:
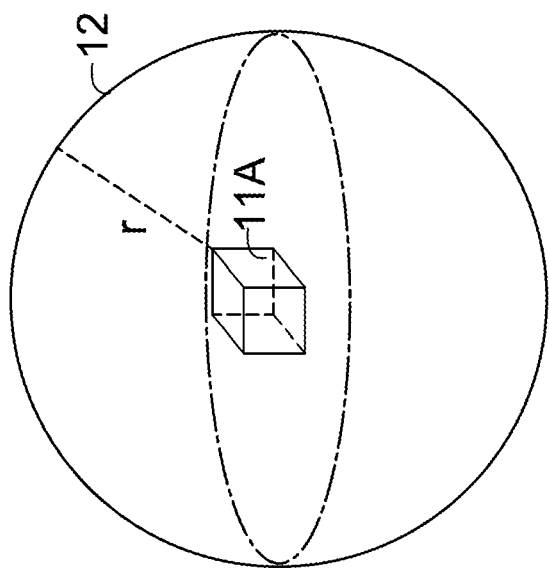
FIG. 3A shows a relation between a cube framework 11A and a sphere 12.
Figure 3C:
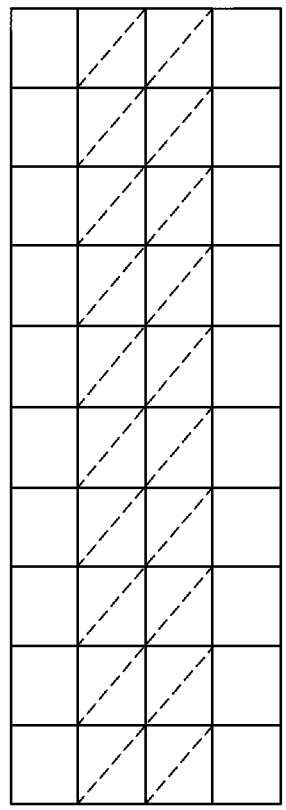
FIG. 3C shows an exemplary polygon mesh composing/modeling the equirectangular panoramic image.
Figure 3B:
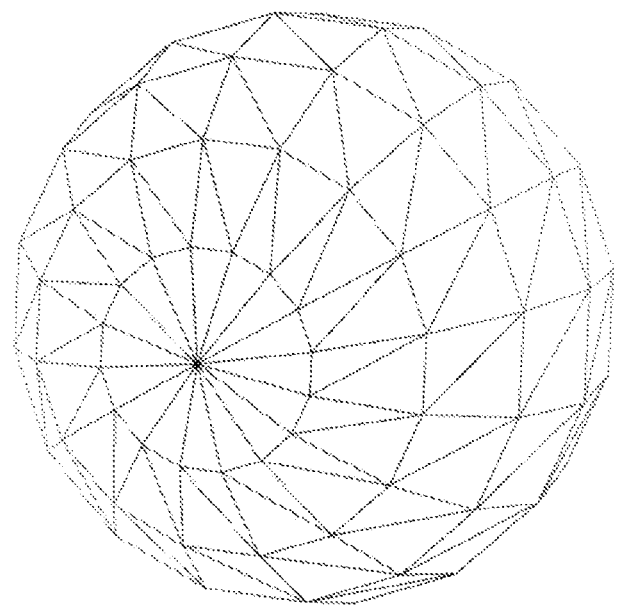
FIG. 3B shows an exemplary triangle mesh modeling a surface of the sphere 12.
Figure 3D:
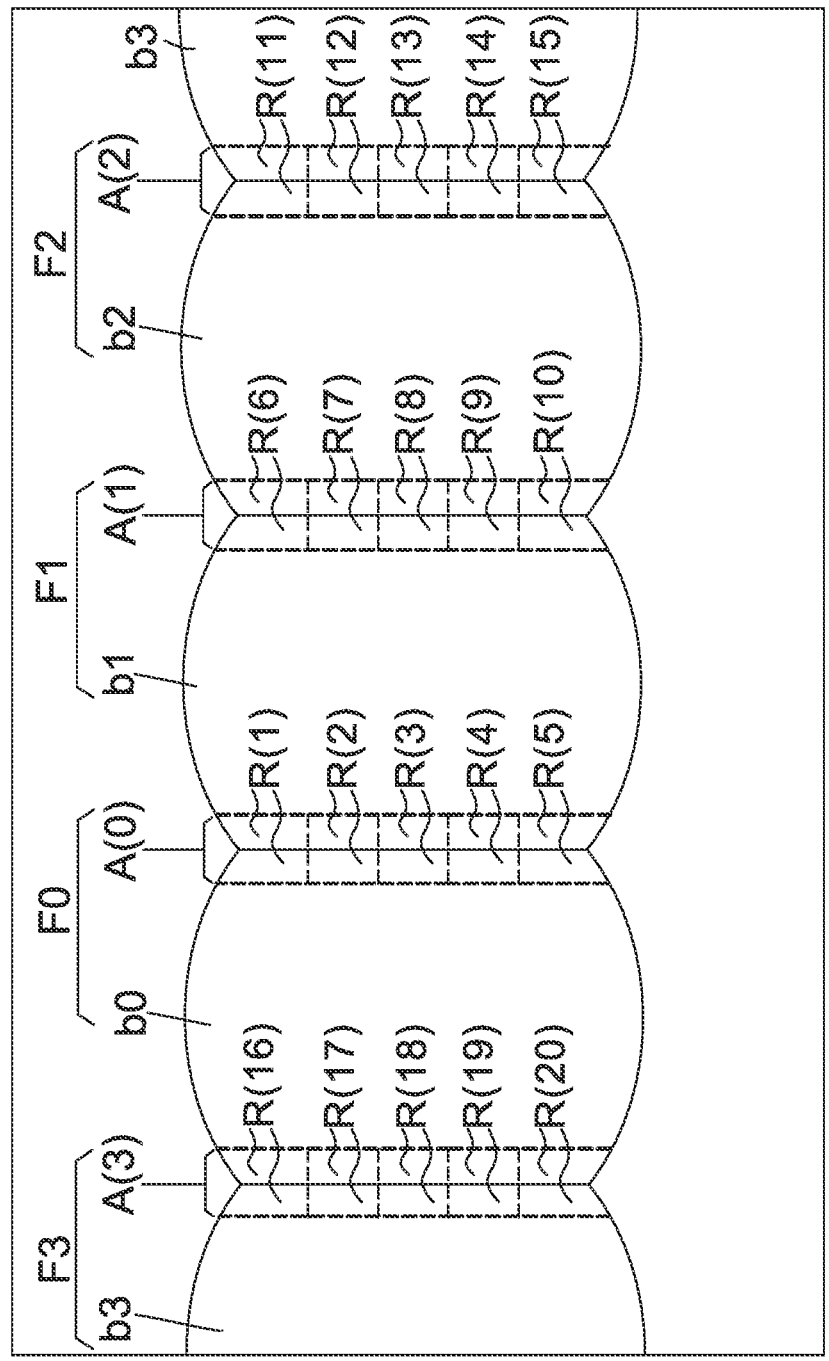
FIG. 3D shows an exemplary equirectangular panoramic image with four overlap regions A(0)~A(3) containing twenty control regions R(1)~R(20).

FIG. 3A shows a relation between a cube framework 11A and a sphere 12. Referring to FIGS. 2A and 3A, the four-lens camera 110A includes four lens K0~K3 respectively mounted on four faces of the cube framework 11A. Any two adjacent faces of the cube framework 11A are substantially orthogonal, such as facing toward 0°, 90°, 180°, 270° of longitude of the virtual sphere 12, respectively, to simultaneously capture a view with a 360-degree horizontal FOV and a 90-degree vertical FOV to generate four lens images. Referring to FIG. 3D, pixels in regions A(0)~A(3) are overlapped by two lens/texture images while pixels in other regions b0~b3 come from a single lens/texture image. Stitching/blending operations over the overlap regions A(0) ~A(3) are performed to form an equirectangular panoramic image. In general, the sizes of the overlap regions (e.g., A(0)~A(3) in FIG. 3D) vary according to the FOVs of the lenses, the resolutions of lens sensors and the lens angles arranged in the camera 110A.

The processing pipeline for the multiple-processor system 100 is divided into an offline phase and an online phase. In the offline phase, as soon as the FOVs of the lenses, the resolutions of lens sensors and the lens angles arranged in the camera 110A are fixed, the sizes of the overlap regions A(0)~A(3) are fixed. Then, the four lenses of the camera 110A are calibrated separately. Appropriate image registration techniques are adopted to generate an original vertex list so that each vertex in the original vertex list provides the vertex mapping between the equirectangular panoramic image and lens images (or between the equirectangular coordinates and the texture coordinates). For example, the sphere 12 with 2-meter radius (r=2) is drawn in many circles as latitude and longitude, whose intersection points are treated as calibration points. The four lenses K0~K3 capture these calibration points, and their positions on lens images are known. Then the mapping relationship between the equirectangular panoramic image and lens images are constructed since the view angles of the calibration points and texture coordinates are linked. A calibration point with the mapping relationship is defined as a "vertex" in this invention. In brief, the calibration between the lens images and the equirectangular panoramic image is conducted for the vertices to generate the original vertex list in the offline phase.

FIG. 3B shows a triangle mesh modeling a sphere surface. The surface of the sphere 12 is modeled by using a triangle mesh as shown in FIG. 3B. FIG. 3C shows a polygon mesh composing/modeling the equirectangular panoramic image. The polygon mesh of FIG. 3C is produced by performing an equirectangular projection of the triangle mesh of FIG. 3B. The polygon mesh in FIG. 3C is a collection of quadrilaterals and/or triangles.

In offline phase, according to the geometry of the equirectangular panoramic image and lens images, equirectangular coordinates and texture coordinates for each vertex in the polygon mesh (FIG. 3C) are computed to generate an original vertex list. In the offline phase, after the FOVs of the lenses, the resolutions of lens sensors and the lens angles arranged in the camera 110A are fixed, the original vertex list only needs to be computed/generated once. The original vertex list is a list of a plurality of vertices forming a plurality of quadrilaterals and/or triangles of the polygon mesh (FIG. 3C) and each vertex is defined by its corresponding data structure. The data structure defines a vertex mapping between a destination space and a texture space (or between the equirectangular coordinates and the texture coordinates). Table 1 shows an exemplary data structure of each vertex in the original vertex list.

TABLE 1

| Attributes | Descriptions |
|---|---|
| (x, y) | Equirectangular coordinates |
| N | Number of covering/overlapping lens images |
| $ID_1$ | ID of first lens image |
| $(u_1, v_1)$ | Texture coordinates in first lens image |
| $w_1$ | Blending weight for stitching in first lens image |
| $(idx_{10}, idx_{11})$ | Warping coefficient indices in first lens image |
| $Alpha_1$ | Blending weight for warping coefficients in first lens image |
| ... | ... |
| $ID_N$ | ID of $N^{th}$ lens image |
| $(u_N, v_N)$ | Texture coordinates in $N^{th}$ lens image |
| $w_N$ | Blending weight for stitching in $N^{th}$ lens image |
| $(idx_{N0}, idx_{N1})$ | Warping coefficient indices in $N^{th}$ lens image |
| $Alpha_N$ | Blending weight for warping coefficients in $N^{th}$ lens image |

Figure 4A:
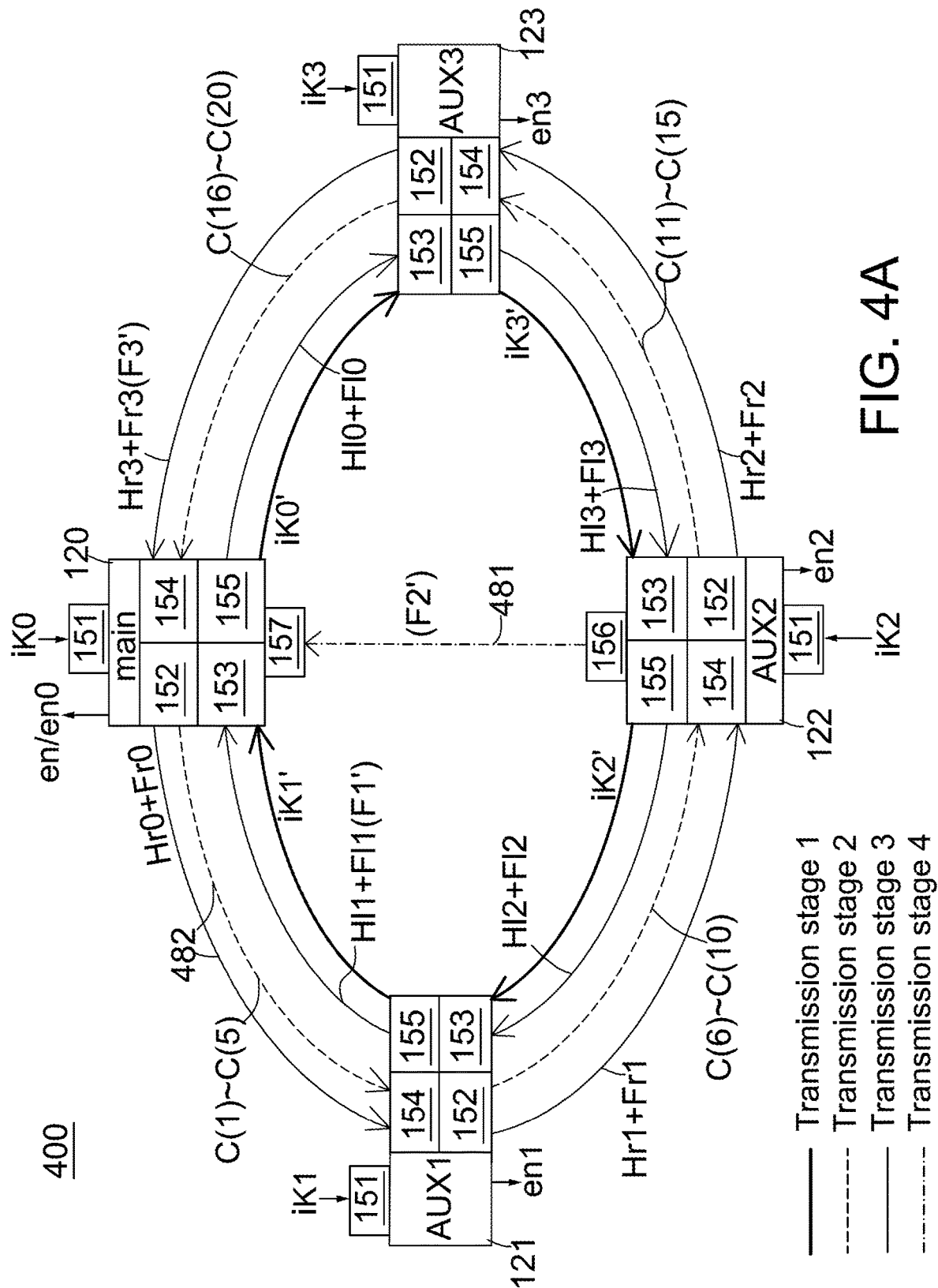
FIG. 4A is a block diagram of a four-processor system for a four-lens camera 110A according to an embodiment of the invention.

FIG. 4A is a block diagram of a four-processor system for a four-lens camera 110A according to an embodiment of the invention. Referring to FIG. 4A, the four-processor system 400 for processing image data from the four-lens camera 110A includes a main PC 120, three auxiliary PCs 121~123 and nine links. Here, each link is conjected between two of the PCs, where the link 481 is optional. The four PCs 120~123 are conjected to the lenses K0, K1, K2 and K3 of the camera 110A via input ports 151, respectively. For purpose of clarity and ease of description, only the main PC 120 and three auxiliary PCs 121~123 with their I/O ports and the nine links are shown in FIG. 4A and will be described herein. In this embodiment, the main PC 120 includes six I/O ports 151~155 and 157, the auxiliary PC 121/123 includes five I/O ports 151~155 and the auxiliary PC 122 includes six I/O ports 151~156. Here, the I/O ports 151, 153~154 and 157 are configured as input ports while the I/O ports 152 and 155~156 are configured as output ports. Each link conjects one input port of one PC to one output port of another PC. Please note that although multiple links are shown between one input port of one PC and one output port of another PC in FIGS. 4A, 8 and 9A, in fact, the multiple links refer to the same link and only indicate data transfers over the same link between the two PCs are conducted at multiple different time points. For example, two links 482 between the I/O port 152 of PC 120 and the I/O port 154 of PC 121 in FIG. 4A indicate data transfers over the same link 482 are conducted at two different time points, i.e., transmission stage 2 and 3; four links 801 between the I/O port 152 of PC 121 and the I/O port 153 of PC 120 in FIG. 8 indicate data transfers over the same link 801 are conducted at four different time points, i.e., at different transmission stages 1~4.

It is to be understood that FIGS. 4A/8/9A illustrate the conjection topology of the PCs, not necessarily the physical arrangement of the PCs. Similarly, use herein of terms such as "neighboring," or "adjacent" to describe the PCs should be understood as referring to the conjection topology and not to a particular physical arrangement.

In the offline phase, since the four-processor system 400 includes the four PCs 120~123, the original vertex list (e.g., Table 1) is divided into four original vertex sub-lists, i.e., an original main vertex sub-list on) and three original AUX vertex sub-lists or1~or3 according to the equirectangular coordinates, and the four original vertex sub-lists or0~or3 are respectively stored into the four local NVMs 160~163 for subsequent image processing.

Figure 4B:
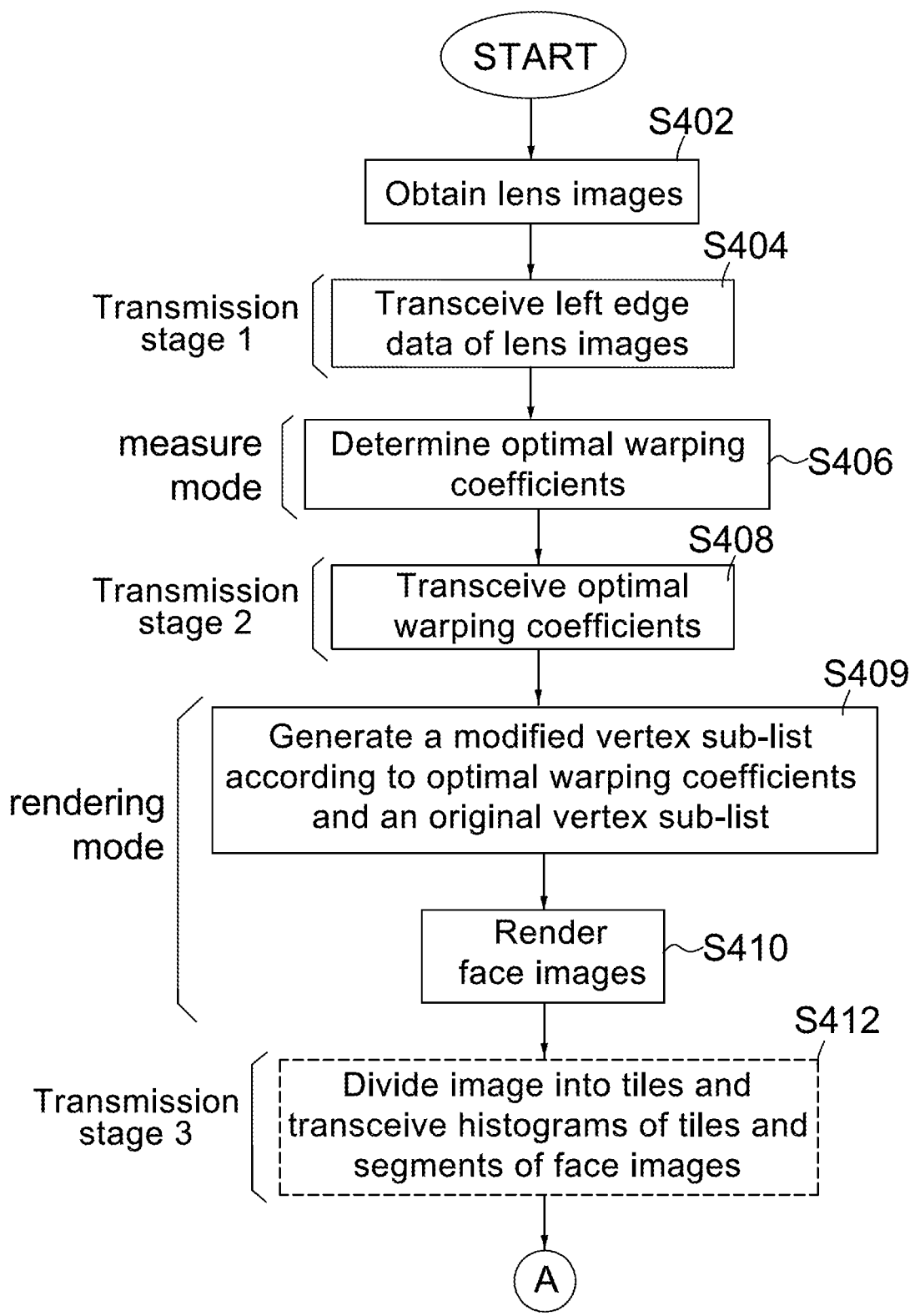
FIG. 4B-4C show a flow chart of an image processing method for the multiple-processor system 100/400/800/900 according to the invention.
Figure 4C:
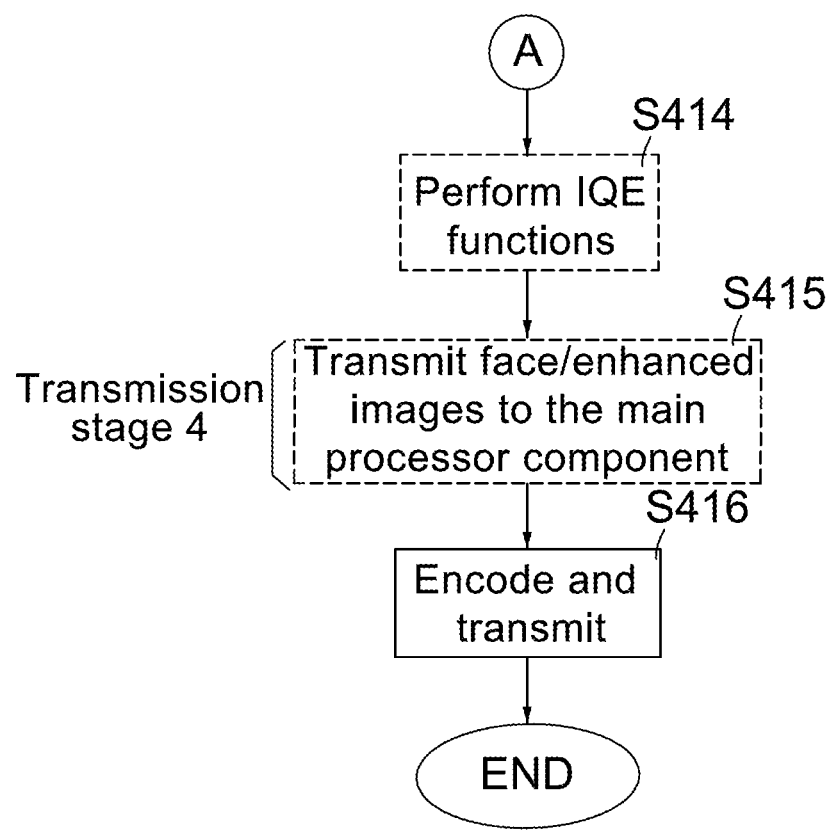

FIGS. 4B-4C show a flow chart of an image processing method for the multiple-processor system 100/400/800/900 according to the invention. The operations of the four-processor system 400 are described below in order of the flow of FIGS. 4B-4C. In step S402, the ISP 131 in each PC 12*j* receives and parses MIPI packets containing the electronic signals associated with image sensors of a corresponding lens in the camera 110A via the MIPI port 151, transforms the electronic signals into a digital lens image iKj and stores the digital lens image iKj in its local VM 17*j* according to the data type (e.g., 0x2A) of the packet headers, where $0 \leq j \leq 3$.

In the example of FIG. 4A, each PC is responsible for a single overlap region as shown in FIG. 3D. In an embodiment, the PCs 120~123 respectively obtain lens images iK0~iK3 and are responsible for the overlap regions A(3), A(0), A(1) and A(2), respectively. For purpose of clarity and ease of description, the following examples and embodiments are described with the assumption that the PCs 120~123 obtain lens images iK0~iK3 and are responsible for the overlap regions A(0), A(1), A(2) and A(3), respectively.

In step S404 (transmission stage 1), to form the four overlap regions, each PC needs to transmit outbound left edge data of its own lens image to one neighboring PC via the output port 155, and receive inbound left edge data of its right neighboring lens image from the other neighboring PC via the input port 153. For each PC, the outbound left edge data of its own lens image is located at an edge opposite to its given/responsible overlap region, the right edge data of its own lens image and the received left edge data of its right neighboring lens image form its given/responsible overlap region, and the sizes of the right edge data of its own lens image and the received left edge data of its right neighboring lens image are associated with the size of its responsible overlap region; for example, edge data rK0' and iK1' form A(0) and the sizes of edge data rK0' and iK1' are associated with the size of A(0). As set forth above, as soon as the FOVs of the lenses, the resolutions of lens sensors and the lens angles arranged in the camera 110A are fixed, the sizes of the overlap regions A(0)~A(3) are determined. Assuming that the left edge data and the right edge data of a lens image respectively refer to a leftmost quarter (i.e., H*W/4; H and W respectively denote the height and the width of the lens image) and a rightmost quarter (H*W/4) of the lens image. Since the PC 120 obtains the lens image iK0 and is responsible for the overlap regions A(0), the ISP 131 of the PC 120 needs to transmit a leftmost quarter iK0' of its own lens image iK0 to the PC 123 via the output port 155, and the GPU 132 of the PC 120 receives and parses MIPI packets containing a leftmost quarter iK1' of its right neighboring lens image iK1 from the ISP 131 of its neighboring PC 121 via the input port 153 and stores the leftmost quarter iK1' into the local VM 170 according to the data type (e.g., 0x30 for inbound edge data) of packet headers so that the leftmost quarter iK1' and the rightmost quarter rK0' of its own lens image iK0 form the overlap region A(0). In step S404, the PCs 121~123 operate in the similar way to the PC 120.

Figure 5A:
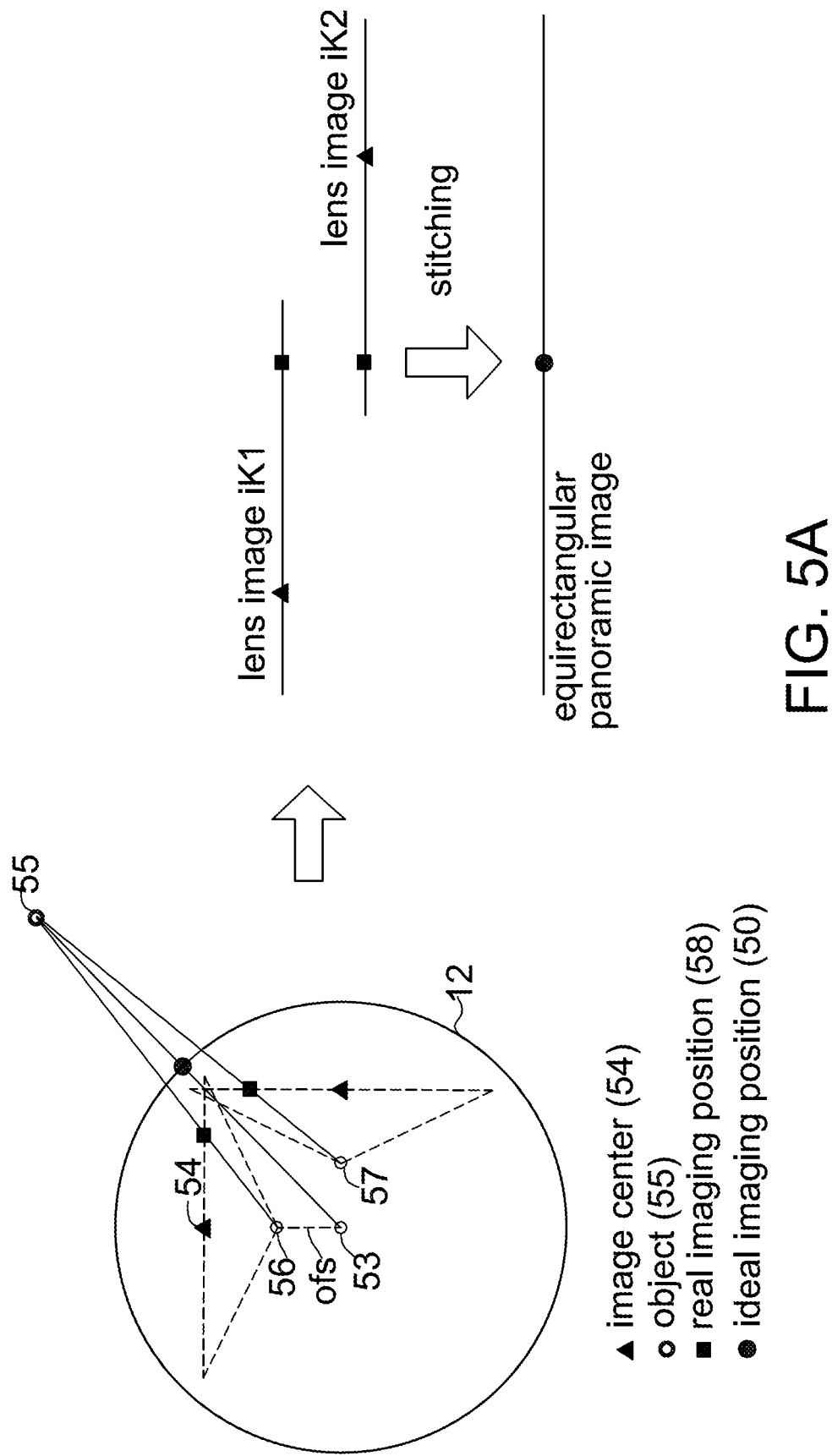
FIG. 5A shows how a mismatch image defect is improved for an object case after all the texture coordinates of each lens image for all vertices are modified according to optimal warping coefficients.

In an ideal case, the four lenses K0~K3 simultaneously located at the camera system center 53 of the cube framework 11A, so a single ideal imaging point 50 derived from an object 55 is located on an image plane 12 with 2-meter radius (r=2) as shown in the left portion of FIG. 5A. Take lenses K1 and K2 for example. Since the ideal imaging position 50 in the lens image iK1 matches the ideal imaging position 50 in the lens image iK2, a perfect stitching/blending result is shown in the equirectangular panoramic image after an image stitching/blending process is completed. However, in real cases, the lens centers 56 and 57 for lenses K1 and K2 are separated from the system center 53 by an offset ofs, so a mismatch image defect is produced in the equirectangular panoramic image after an image stitching process is completed.

FIG. 3D shows an exemplary equirectangular panoramic image with four overlap regions containing twenty control regions R(1)~R(20). Referring to FIG. 3D, each of the four overlap regions A(0)~A(3) contains P1 control regions in a column, where P1>=3. The following examples and embodiments will be described with five (P1=5) control regions in each overlap region of the equirectangular panoramic image. In the example of FIG. 3D, there are twenty control regions R(1)~R(20) in the equirectangular panoramic image, and the twenty control regions R(1)~R(20) respectively have twenty warping coefficients C(1)~C(20). The warping coefficients C(1)~C(20) respectively denote different warping degrees for the control regions R(1)~R(20).

Figure 5B:
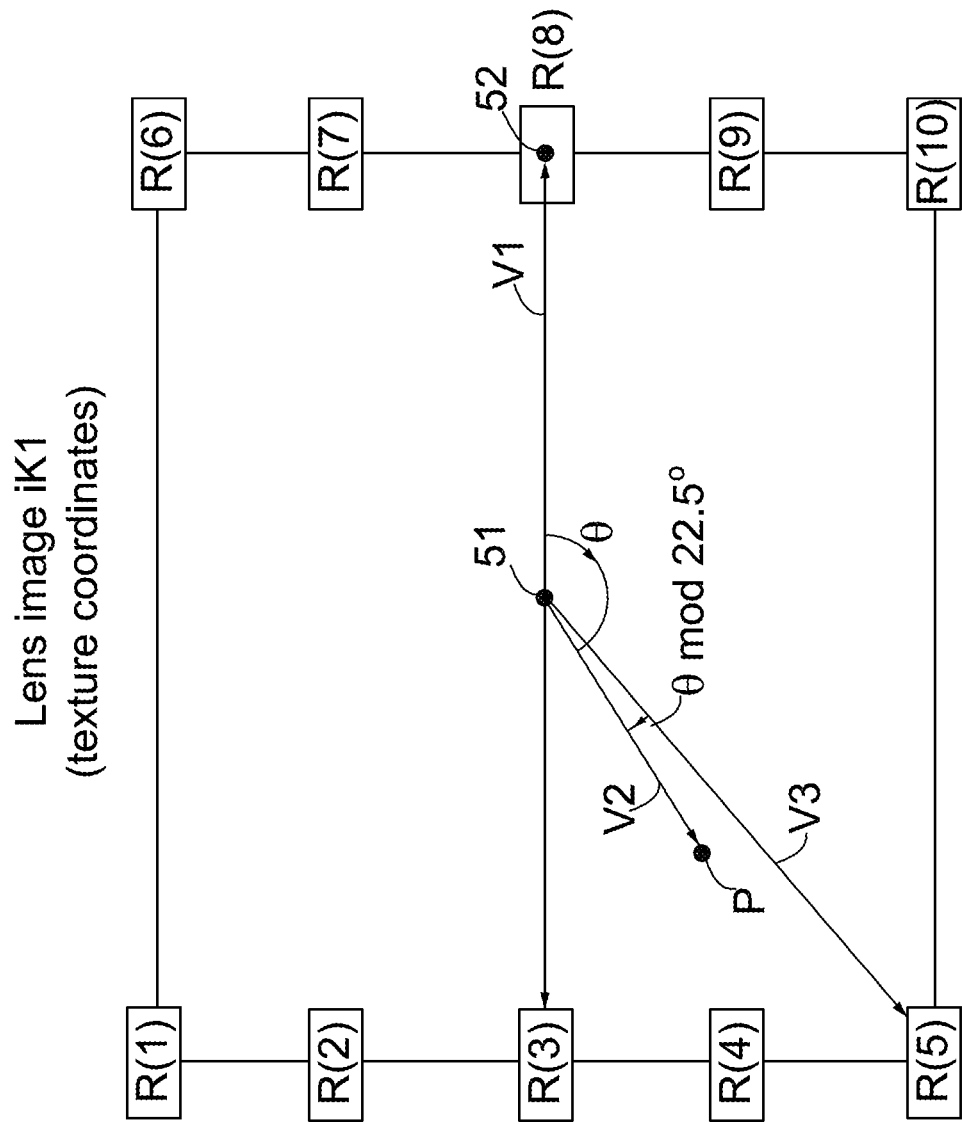
FIG. 5B is an example showing a relation between the target vertex P and ten control regions R(1)~R(10) in the lens image iK1.

In measure mode, the texture coordinates in each lens image for each vertex from the four original vertex sub-lists or0~or3 are modified by each GPU 132 for generation region errors of control regions according to two "test" warping coefficients of two immediately-adjacent control regions of a target vertex and a corresponding blending weight (for warping coefficients) of the target vertex (Step S705 & S706), while in rendering mode, the texture coordinates in each lens image for each vertex from the four original vertex sub-lists or0~or3 are modified by each GPU 132 to minimize the above mismatch image defect according to two "optimal" warping coefficients of two immediately-adjacent control regions of the target vertex and a corresponding blending weight (for warping coefficients) of the target vertex (Step S409). FIG. 5B is an example showing a position relation between a target vertex P and ten control regions R(1)~R(10) in the lens image iK1. In the example of FIG. 5B, the angle θ is clockwise and formed between a first vector V1 (starting from the image center 51 (with texture coordinates ($u_{center}$, $v_{center}$)) to the location 52 of a starting control region R(8)) and a second vector V2 (starting from the image center 51 to the target vertex P with texture coordinates ($u_p$, $v_p$)). Given that θ=119.5°, because there are five control regions on each of the right side and the left side of the lens image iK1, then 90°/4=22.5°, idx=θ/22.5°=5 and θ mod 22.5°=θ−idx×22.5°=7°. In offline phase, it is determined which two control regions (i.e., R(4) and R(5)) are immediately adjacent to the target vertex P and their indices (4 and 5) are written to the "warping coefficient indices" field in the lens image iK1 of the data structure of the target vertex P in the original vertex sub-list or1 (see Table 1); besides, a blending corresponding weight (=7/22.5) for the warping coefficients (C(4) and C(5)) is calculated in offline phase and written to the "Alpha" field in the lens image iK1 of the data structure of the target vertex P in the original vertex sub-list on. Please note that a set of twenty test warping coefficients ($C_t(1)$ to $C_t(20)$) for the measure mode and a set of twenty optimal warping coefficients (C(1) to C(20)) for rendering mode are respectively arranged as a 1-D warping coefficient array or a 1-D data stream; moreover, values of the set of twenty test warping coefficients ($C_t(1)$ to $C_t(20)$) are assigned according to the offset ofs in FIG. 5A in measure mode (step S702) (will be described) while values of the set of the twenty optimal warping coefficients (C(1) to C(20)) are determined at the end of the measure mode (step S406 & S772) and used in the rendering mode (step S409).

A feature of the invention is to determine optimal warping coefficients for the twenty control regions within a predefined number of loops (e.g., max in FIG. 7A) in measure mode. The predefined number of loops are associated with an offset ofs that a lens center 56 is separated from the camera system center 53 (see FIG. 5A) in the camera 110A. In measure mode, the twenty test warping coefficients $C_t(1)$~$C_t(20)$ are set to different value ranges for measuring the region errors E(1)~E(20) according to the offset ofs in FIG. 5A, but the twenty test warping coefficients are set to the same value at a time (or for each round). For example, in a case of ofs=3 cm, the twenty test warping coefficients $C_t(1)$~$C_t(20)$ are set to values ranging from 0.96 to 1.04 and there would be nine (i.e., max=9 in FIG. 7A) times of measurement if each increment is 0.01; in a case of ofs=1 cm, the twenty test warping coefficients $C_t(1)$~$C_t(20)$ are set from 0.99 to 1.00 and there would be ten (i.e., max=10 in FIG. 7A) times of measurement if each increment is 0.001. Please note that in the offline phase, the offset ofs is already detected/determined and thus the values of the twenty test warping coefficients $C_t(1)$~$C_t(20)$ for measurement are pre-determined and pre-stored in the local NVMs 16$j$, where 0<=j<=3.

Figure 7A:
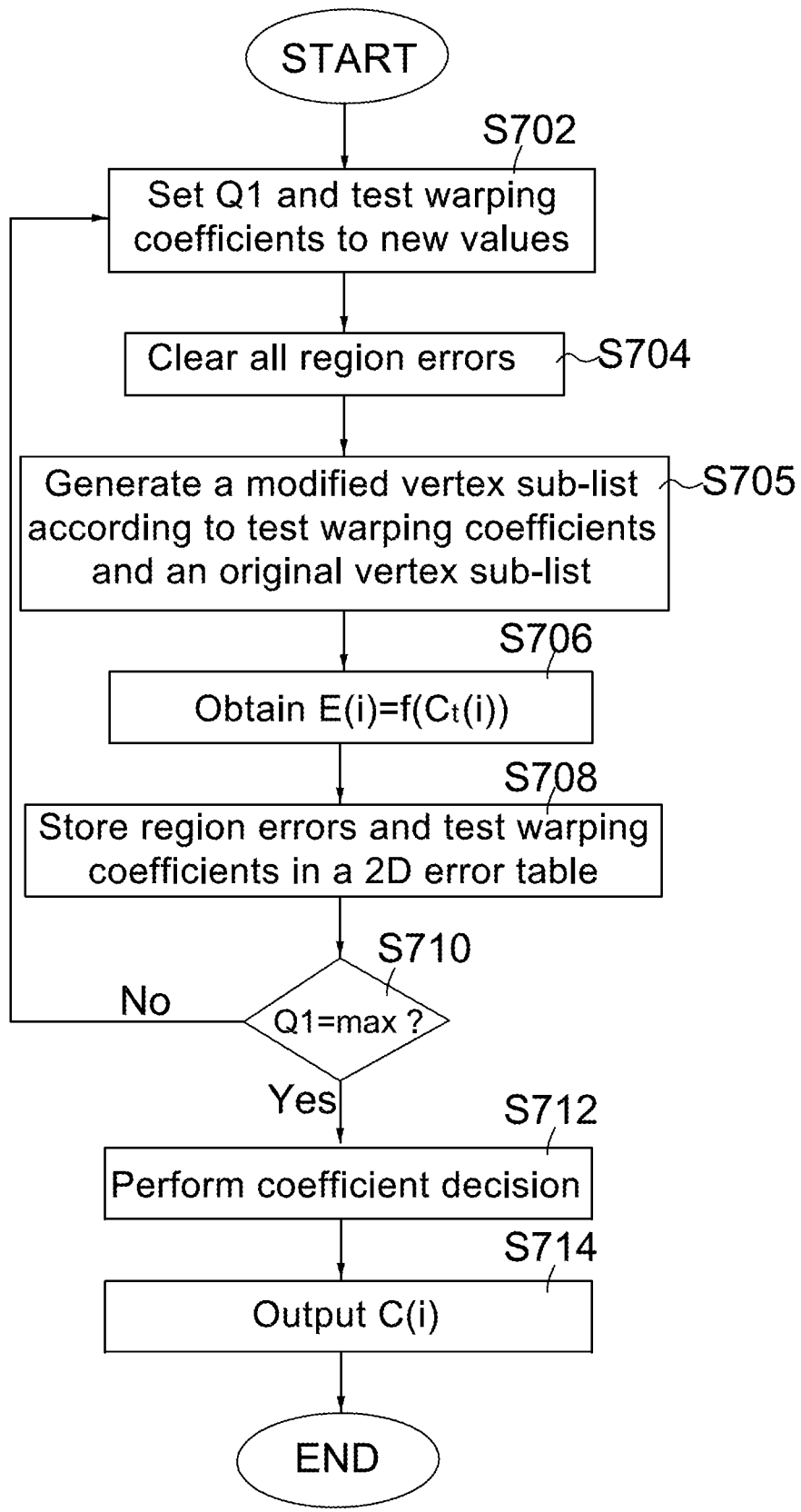
FIG. 7A is a flow chart showing a method of determining the optimal warping coefficients for control regions in measure mode according to an embodiment of the invention.
Figure 7B:
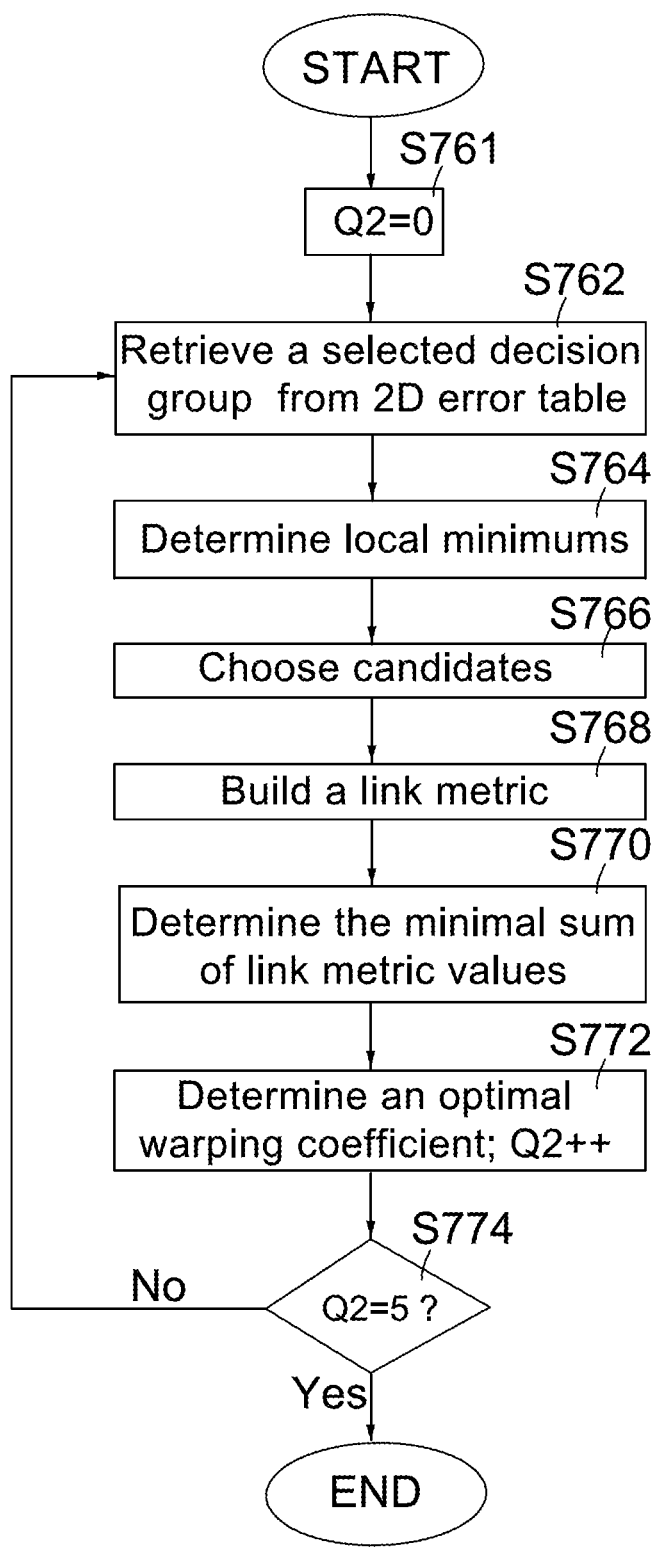
FIG. 7B is a flow chart showing the method of performing the coefficient decision in step S712 by the GPU 132 according to an embodiment of the invention.

In step S406, the method of determining the optimal warping coefficients for control regions in measure mode is performed as shown in FIG. 7A. For purpose of clarity and ease of description, the method of determining the optimal warping coefficients C(6)~C(10) for five control regions R(6)~R(10) in FIG. 7A and the method of performing the coefficient decision in FIG. 7B are described with the GPU 132 in the PC 121 and with the assumption that ofs=3 cm. It should be understood that the methods of FIG. 7A and FIG. 7B are generally applicable to the GPUs 132 in the PCs 120 and 122~123 for generating the optimal warping coefficients C(1)~C(5), C(11)~C(20), respectively.

Step S702: Respectively set the Q1 number of iterations and test warping coefficients to new values. In one embodiment, set the Q1 number of iterations to 1 in a first round and increment Q1 by 1 in each of the following rounds; if ofs=3 cm, set all the twenty test warping coefficients $C_t(1)$~$C_t(20)$ to 0.96 in a first round (i.e., $C_t(1)$= . . . =$C_t(20)$=0.96), and then set them to 0.97, . . . , 1.04 in order in the following eight rounds.

Step S704: Clear all region errors E(i), where i=6, . . . , 10.

Step S705: Generate a modified vertex sub-list m1 according to the original AUX vertex sub-list or1 and values of the test warping coefficients $C_t(1)$~$C_t(10)$. Again, take FIG. 5B for example. After receiving the original AUX vertex sub-list or1 from the local NVM 161, the GPU 132 in the PC 121 simply retrieves two warping coefficients (i.e., $C_t(4)$ and $C_t(5)$) from the 1-D test warping coefficient array ($C_t(1)$~$C_t(20)$) based on the "warping coefficient indices" field (i.e., 4 and 5) in the lens image iK1 of the data structure of the target vertex P and calculates the interpolated warping coefficient C' based on the "Alpha" field (i.e., 7/22.5) in the lens image iK1 of the data structure of the target vertex P (see Table 1) by the following equation: C'=$C_t(4)$×(7/22.5)+$C_t(5)$×(1−7/22.5). Then, the GPU 132 in the PC 121 calculates modified texture coordinates ($u'_p$, $v'_p$) in the lens image iK1 for the target vertex P according to the following equations: $u'_p=(u_p-u_{center})*C'+u_{center}$, $v'_p=(v_p-v_{center})*C'+v_{center}$. In this manner, the GPU 132 in the PC 121 modifies all the texture coordinates in the lens image iK1 for each vertex from the original AUX vertex sub-list or1 according to the ten test warping coefficients $C_t(1)$~$C_t(10)$ to generate a modified AUX vertex sub-list m1. Likewise, the graphics processing units 132 in the PCs 120 and 122~123 respectively modify all the texture coordinates in the three lens images iK0 and iK2~iK3 for each vertex from the original vertex sub-lists or0 and or2~or3 according to the twenty test warping coefficients $C_t(1)$~$C_t(20)$ to generate a modified main vertex sub-list m0 and two modified AUX vertex sub-lists m2~m3. Table 2 shows an exemplary data structure of each vertex in each modified vertex sub-list.

TABLE 2

| Attributes | Descriptions |
|---|---|
| (x, y) | Equirectangular coordinates |
| N | Number of covering/overlapping lens images |
| $ID_1$ | ID of first lens image |
| ($u'_1$, $v'_1$) | Modified texture coordinates in first lens image |
| $w_1$ | Blending weight for stitching in first lens image |
| . . . | . . . |
| $ID_N$ | ID of $N^{th}$ lens image |
| ($u'_N$, $v'_N$) | Modified texture coordinates in $N^{th}$ lens image |
| $w_N$ | Blending weight for stitching in $N^{th}$ lens image |

Step S706: Measure/obtain region errors E(6)~E(10) of the five control regions R(6)~R(10) in the equirectangular panoramic image by the GPU 132 in the PC 121 (will be described in conjection with FIG. 6) based on the modified AUX vertex sub-list m1, the lens image iK1 and the inbound leftmost quarter iK2'. For ease of description, this step S706 is denoted by E(i)=f($C_t(i)$), where i=10; f( ) denotes a function that measures the region error E(i) (by GPU 132 in the PC 121) based on the modified AUX vertex sub-list or1, the lens image iK1 and the leftmost quarter iK2'.

Step S708: Store all region errors E(6)~E(10) and all values of test warping coefficients in a 2D error table. Table 3 shows an exemplary 2D error table for ofs=3 cm (test warping coefficients ranging from 0.96 to 1.04). In Table 3, there are five region errors E(6)~E(10) and nine values of test warping coefficients.

TABLE 3

|  | 1st | 2nd | 3rd | - - - | 7th | 8th | 9th |
|---|---|---|---|---|---|---|---|
| Test warping coefficient | 0.96 | 0.97 | 0.98 | - - - | 1.02 | 1.03 | 1.04 |
| E(6) |  |  |  | - - - |  |  |  |
| E(7) |  |  |  |  |  |  |  |
| E(8) |  |  |  |  |  |  |  |
| E(9) |  |  |  |  |  |  |  |
| E(10) |  |  |  |  |  |  |  |

Step S710: Determine whether the Q1 number of iterations reaches a max value of 9. If YES, the flow goes to step S712; otherwise, the flow goes to Step S702.

Step S712: Perform coefficient decision according to the 2D error table.

Step S714: Output optimal warping coefficients C(i), where i=6, . . . , 10.

FIG. 7B is a flow chart showing the method of performing the coefficient decision in step S712 by the GPU 132 in the PC 121 according to an embodiment of the invention.

Step S761: Set Q2 to 0 for initialization.

Step S762: Retrieve a selected decision group from the 2D error table. Referring to FIG. 3D, since each control region normally adjoins two control regions, a selected control region along with its two neighboring control regions form a selected decision group to determine the optimal warping coefficient for a selected control region. For example, a selected control region R(9) along with R(8) and R(10) form a selected decision group. However, if a selected control region (such as R(6)) is located at top or bottom of the overlap region A(1), then the selected control region R(6) form a selected decision group along with its single neighbor R(7) to determine its optimal warping coefficient C(6). For ease of description, the following steps are described with the assumption that R(7) is selected and forms a selected decision group along with R(6) and R(8) to determine its optimal warping coefficient C(6).

Step S764: Determine local minimums among the region errors for each control region in the selected decision group. Table 4 is an example showing the region errors E(6)~E(8) and the test warping coefficients $C_t$(6)~$C_t$(8).

TABLE 4

| index | test warping coefficient | E(6) | E(7) | E(8) |
|---|---|---|---|---|
| 1 | 0.96 | 1010 | 2600(*) | 820 |
| 2 | 0.97 | 1005 | 2650 | 750 |
| 3 | 0.98 | 1000 | 2800 | 700 |
| 4 | 0.99 | 900 | 3000 | 600(*) |
| 5 | 1.00 | 800(*) | 2700 | 650 |
| 6 | 1.01 | 850 | 2500 | 580 |
| 7 | 1.02 | 950 | 2400(*) | 500(*) |
| 8 | 1.03 | 960 | 2820 | 700 |
| 9 | 1.04 | 975 | 2900 | 800 |

As shown in Table 4, there is one local minimum among the nine region errors of R(6), and there are two local minimums among the nine region errors of R(7) and R(8), where each local minimum is marked with an asterisk.

Step S766: Choose candidates according to the local minimums. Table 5 shows candidates selected from the local minimums in Table 4, where ID denotes the index, WC denotes the warping coefficient and RE denotes the region error. The number of candidates is equal to the number of the local minimums in Table 4.

TABLE 5

|  | R(6) | | | R(7) | | | R(8) | | |
|---|---|---|---|---|---|---|---|---|---|
|  | Number of local minimums | | | | | | | | |
|  | 1 | | | 2 | | | 2 | | |
|  | ID | WC | RE | ID | WC | RE | ID | WC | RE |
| Candidate [0] | 5 | 1.00 | 800 | 1 | 0.96 | 2600 | 4 | 0.99 | 600 |
| Candidate [1] |  |  |  | 7 | 1.02 | 2400 | 7 | 1.02 | 500 |

Figure 7C:
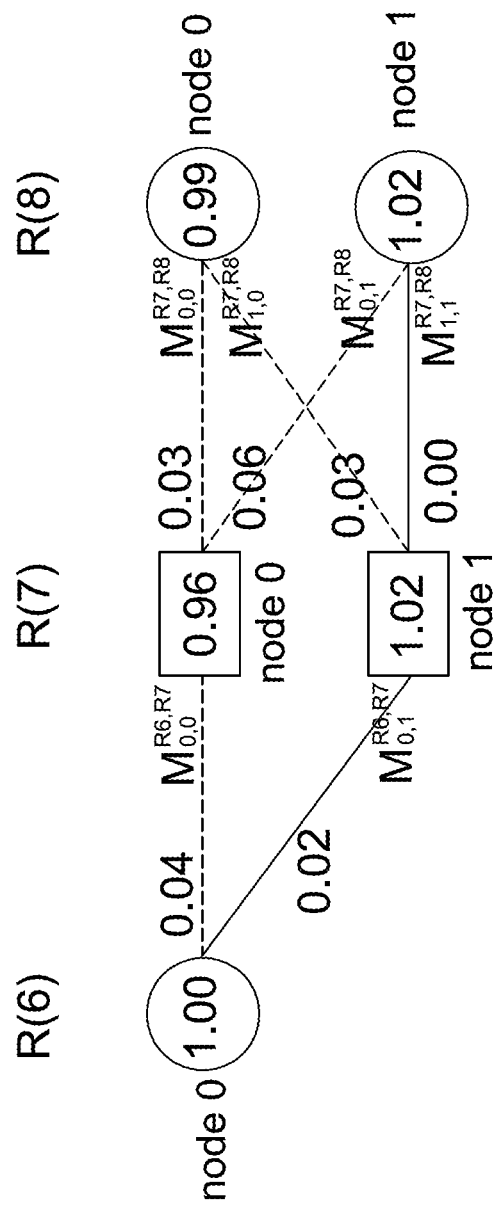
FIG. 7C shows an exemplary link metric.

Step S768: Build a link metric according to the candidates in Table 5. As shown in FIG. 7C, a link metric is built according to the candidates in Table 5.

Step S770: Determine the minimal sum of link metric values among the paths. For the link metric values $M_{0,0}^{R7,R8}$=0.03 and $M_{0,1}^{R7,R8}$=0.06, their minimum value $d_0^{R7,R8}$=min($M_{0,0}^{R7,R8}$,$M_{0,1}^{R7,R8}$)=0.03. For the link metric values $M_0^{R7,R8}$=0.03 and $M_{1,1}^{R7,R8}$=0.00, their minimum value $d_1^{R7,R8}$=min($M_{1,0}^{R7,R8}$,$M_{1,1}^{R7,R8}$)=0.00. Then, respectively compute sums of link metric values for path 0-0-0 and path 0-1-1 as follows: $S_0^{R7}$=$d_0^{R6,R7}$+$d_0^{R7,R8}$=0.04+0.03=0.07 and $S_1$=$d_1^{R6,R7}$+$d_1^{R7,R8}$=0.02+0.00=0.02. Since $S_0^{R7}$>$S_1^{R7}$, it is determined that $S_1^{R7}$ (for path 0-1-1) is the minimal sum of link metric values among the paths as the solid-line path shown in FIG. 7C.

Step S772: Determine an optimal warping coefficient for the selected control region. As to the example given in step S770, since $S_1^{R7}$ (for path 0-1-1) is the minimal sum of link metric values among the paths, 1.02 is selected as the optimal warping coefficient of control region R(7). However, if two or more paths have the same sum at the end of calculation, the warping coefficient of the node with minimum region error is selected for the selected control region. Here, the Q2 number of iterations is incremented by 1.

Step S774: Determine whether the Q2 number of iterations reaches a limit value of 5 (=P1). If YES, the flow is terminated; otherwise, the flow goes to Step S762 for a next control region. In the same manner, the GPU 132 in each of the PCs 120~123 forms its own 2D error table (e.g., Table 3) and then determines the five optimal warping coefficients of the five control regions in its responsible overlap region.

Figure 6:
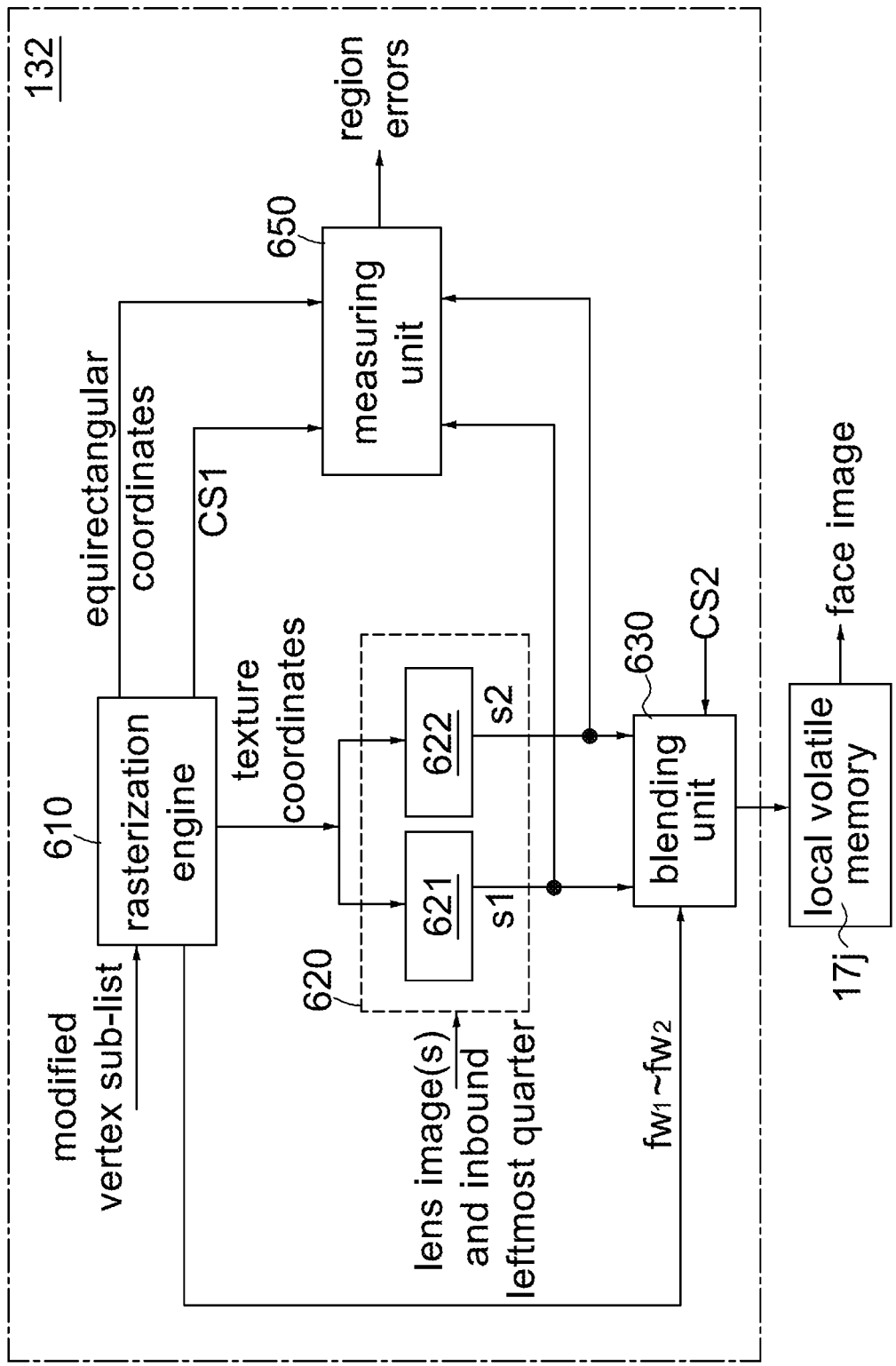
FIG. 6 is a schematic diagram of the GPU 132 according to one embodiment of the invention.

FIG. 6 is a schematic diagram of the GPU 132 according to one embodiment of the invention. Referring to FIG. 6, the GPU 132 in each PC 120~123 includes a rasterization engine 610, a texture mapping circuit 620, a blending unit 630 controlled by a control signal CS2 and a measuring unit 650 controlled by a control signal CS1. Please note that the blending unit 630 is disabled and the measuring unit 650 is enabled by the control signals CS1 and CS2 if the equirectangular coordinates of a point fall in the responsible control regions in measure mode. The blending unit 630 is enabled and the measuring unit 650 is disabled by the control signals CS1 and CS2 in rendering mode. The texture mapping circuit 620 includes two texture mapping engines 621~622. As shown in FIG. 3C, the polygon mesh is a collection of quadrilaterals and/or triangles. Thus, the rasterization engine 610 may perform quadrilateral rasterization for each point/pixel in each quadrilateral in FIG. 3C formed by each group of four vertices from one modified vertex sub-list, or perform triangle rasterization for each point/pixel in each triangle in FIG. 3C formed by each group of three vertices from one modified vertex sub-list.

For a quadrilateral case, assuming each of four vertices (A, B, C, D) (forming one quadrilateral of the polygon mesh) from the modified main vertex sub-list m0 is located in one of the control regions of overlap region A(0) and is overlapped with two lens images (iK0, iK1; N=2), the four vertices (A, B, C, D) have the following data structures contained in the vertex sub-list m0: vertex A:$\{(x_A, y_A), 2, ID_{iK0}, (u_{1A}, v_{1A}), w_{1A}, ID_{iK1}, (u_{2A}, v_{2A}), w_{2A}\}$; vertex B:$\{(x_B, y_B), 2, ID_{iK0}, (u_{1B}, v_{1B}), q_{1B}, ID_{iK1}, (u_{2B}, v_{2B}), w_{2A}\}$; vertex C:$\{(x_C, y_C), 2, ID_{iK0}, (u_{1C}, v_{1C}), w_{1C}, ID_{iK1}, (u_{2C}, v_{2C}), w_{2C}\}$; vertex D:$\{(x_D, y_D), 2, ID_{iK0}, (u_{1D}, v_{1D}), w_{1D}, ID_{iK1}, (u_{2D}, v_{2D}), w_{2D}\}$. The rasterization engine 610 in the PC 120 (responsible for A(0)) directly performs quadrilateral rasterization operations for each point/pixel in the quadrilateral ABCD. Specifically, the rasterization engine 610 in the PC 120 computes texture coordinates for each lens image based on a point Q having equirectangular coordinates (x, y) within a quadrilateral ABCD of the polygon mesh by using the following steps: (1) Compute four spatial weighting values (a,b,c,d) according to equirectangular coordinates $(x_A, y_A, x_B, y_B, x_C, y_C, x_D, y_D, x, y)$ by using a bi-linear interpolation method. (2) compute a face blending weight $fw_1$ for a sample point $Q_{iK0}$ (corresponding to point Q) in lens image iK0: $fw_1=a*w_{1A}+b*w_{1B}+c*w_{1C}+d*w_{1D}$, compute a face blending weight $fw_2$ for a sample point am (corresponding to point Q) in lens image iK1: $fw_2=a*w_{2A}+b*w_{2B}+c*w_{2C}+d*w_{2D}$. (3) compute texture coordinates for the sample point $Q_{iK0}$ (corresponding to point Q) in lens image iK0: $(u1,v1)=(a*u_{1A}+b*u_{1B}+c*u_{1C}+d*u_{1D}, a*v_{1A}+b*v_{1B}+c*v_{1C}+d*v_{1D})$; compute texture coordinates for the sample point $q_{iK1}$ (corresponding to point Q) in lens image iK1: $(u2,v2)=(a*u_{2A}+b*u_{2B}+c*u_{2C}+d*u_{2D}, a*v_{2A}+b*v_{2B}+c*v_{2C}+d*v_{2D})$. Finally, the rasterization engine 610 in the PC 120 sends the two texture coordinates (u1, v1) and (u2, v2) to the two texture mapping engines 621~622 in parallel, and sends the two face blending weights $fw_1$ and $fw_2$ to the blending unit 630. Here, a+b+c+d=1 and $fw_1+fw_2=1$. According to the two texture coordinates (u1, v1) and (u2, v2), the texture mapping engines 621~622 in the PC 120 texture map the texture data from the lens images iK0 and iK1 using any appropriate method (such as nearest-neighbour interpolation, bilinear interpolation or trilinear interpolation) to generate two sample values s1 and s2. Here, the sample value (s1~s2) may be a luma value, a chroma value, an edge value, a pixel color value (RGB), or a motion vector.

For a triangle case, the rasterization engine 610 and the texture mapping engines 621~622 in the PC 120 perform similar operations to the above quadrilateral case for each point/pixel in a triangle formed by each group of three vertices from the modified vertex sub-list m0 to generate two corresponding sample values s1 and s2, except that the rasterization engine 610 computes three spatial weighting values (a,b,c) for three input vertices (A, B, C) according to equirectangular coordinates $(x_A, y_A, x_B, y_B, x_C, y_C, x, y)$ by using a barycentric weighting method, rather than by using a bi-linear interpolation method in step (1).

Next, according to the equirectangular coordinates (x, y) of the point Q, the rasterization engine 610 in the PC 120 determines whether the point Q falls in one of the five responsible control regions R(1)~R(5) and then asserts the control signal CS1 to cause the measuring unit 650 to estimate/measure the region error of the control region if the point Q falls in the responsible control regions. The measuring unit 650 in the PC 120 may estimate/measure the region errors of the control regions R(1)~R(5) by using known algorithms, such as SAD (sum of absolute differences), SSD (sum of squared differences), MAD (median absolute deviation), etc. For example, if the point Q is determined to fall in control region R(1), the measuring unit 650 may accumulate the absolute value of the sample value difference between each point in the control region R(1) of the lens image iK0 and its corresponding point in the control region R(1) of the lens image iK1 to obtain the SAD value as the region error E(1) for the control region R(1), by using the following equations: E=|s1−s2|, E(1)+=E. In this manner, the measuring unit 650 in the PC 120 measures five region errors E(1)~E(5) for the control regions R(1)~R(5). In the same manner, the measuring unit 650 in the PC 121 measures region errors E(6)~E(10) for the five control regions R(6)~R(10) according to its modified AUX vertex sub-list m1, the lens image iK1 and a leftmost quarter iK2' of its right neighboring lens image iK2; the measuring unit 650 in the PC 122 measures region errors E(11)~E(15) for the five control regions R(11)~R(15) according to its modified AUX vertex sub-list m2, the lens image iK2 and a leftmost quarter iK3' of its right neighboring lens image iK3; the measuring unit 650 in the PC 123 measures region errors E(16)~E(20) for the five control regions R(16)~R(20) according to its modified AUX vertex sub-list m3, the lens image iK3 and a leftmost quarter iK0' of its right neighboring lens image iK0 (see also step S706).

In step S408 (transmission stage 2), the GPU 132 in each of the PCs 120~123 transmits the optimal warping coefficients of its five control regions in its responsible overlap region via the output port 152 to the GPU 132 in one neighboring PC and receives the optimal warping coefficients of the five control regions in the left neighboring overlap region from the GPU 132 in the other neighboring PC via the input port 154. For example, the GPU 132 in the PC 122 transmits the optimal warping coefficients C(11)~C(15) of the five control regions R(11)~R(15) in its responsible overlap region A(2) via the output port 152 to the GPU 132 in the PC 123, receives and parses MIPI packets containing the optimal warping coefficients C(6)~C(10) of the five control regions R(6)~R(10) from the GPU 132 in the PC 121 via the input port 154, and stores the optimal warping coefficients C(6)~C(10) into the local VM 172 according to the data type (e.g., 0x31 for inbound optimal warping coefficients) of packet headers. The GPUs 132 in the PCs 120~121 and 123 operate in the similar way to the GPU 132 in the PC 121.

In step S409, similar to step S705, the GPUs 132 in the PCs 120~123 respectively modify all the texture coordinates in the four lens images iK0~iK3 for each vertex from the original vertex sub-lists or0~or3 according to the above twenty optimal warping coefficients C(1)~C(20) to generate a modified main vertex sub-list m0' and three modified AUX vertex sub-lists m1'~m3'. Again, take FIG. 5B for example. After receiving the five optimal warping coefficients C(1)~C(5) from the PC 120, the GPU 132 in the PC 121 simply retrieves two warping coefficients (i.e., C(4) and C(5)) from the 1-D optimal warping coefficient array (C(1)~C(10)) based on the "warping coefficient indices" field (i.e., 4 and 5) in the lens image iK1 of the data structure of the target vertex P from the original AUX vertex sub-list or1 and calculates the interpolated warping coefficient C' based on the "Alpha" field (i.e., 7/22.5) in the lens image iK1 of the data structure of the target vertex P by the following equation: C'=C(4)×(7/22.5)+C(5)×(1−7/22.5). Then, the GPU 132 in the PC 121 calculates modified texture coordinates $(u'_p, v'_p)$ in the lens image iK1 for the target vertex P according to the following equations: $u'_p=(u_p-u_{center})*C'+u_{center}$, $v'_p=(v_p-v_{center})*C'+v_{center}$. In this manner, the GPU 132 in the PC 121 modifies all the texture coordinates in the lens image iK1 for each vertex from the original AUX vertex sub-list or1 according to the ten optimal warping coefficients C(1)~C(10) to generate a modified AUX vertex sub-list m1'. After all the texture coordinates in the four lens images for all vertices from the four original vertex sub-lists or0~or3 are modified according to the twenty optimal warping coefficients (C(1)~C(20)), the mismatch image defects caused by shifted lens centers of the camera 110A (e.g., a lens center 56 is separated from the system center 53 by an offset ofs) would be greatly improved (i.e., the real imaging positions 58 are pulled toward the idea imaging positions 50) as shown in the right side of FIG. 5A. Please note that since the sphere 12 is virtual, the object 55 may be located outside, inside the sphere 12 or on the surface of the sphere 12.

In step S410, the rasterization engine 610, the texture mapping circuit 620 and the blending unit 630 operate together in each PC to generate a face image according to its own lens image, a leftmost quarter of its right neighboring lens image and its modified vertex sub-list. For example, the rasterization engine 610, the texture mapping circuit 620 and the blending unit 630 operate together in the AUX PC 123 to generate a face image F3 according to its own lens image iK3, a leftmost quarter iK0' of its right neighboring lens image iK0 and its modified vertex sub-list m3'. The term "face image" refers to an image derived from a projection (such as equirectangular projection, cylindrical projection, Miller projection, Mercator projection, Lambert cylindrical equal area projection or Panjini projection) of a corresponding lens image from the camera 110. In this invention, each face image includes a non-overlap region and an overlap region. For example, since the PC 123 is responsible for overlap region A(3), the PC 123 would render a face image F3 including a non-overlap region b3 and an overlap region A(3) as shown in FIG. 3D.

Referring back to FIG. 6, the rasterization engine 610 and the texture mapping circuit 620 in rendering mode operate in the same way as in measure mode. Again, take the above case (the point Q has equirectangular coordinates (x, y) within the quadrilateral ABCD that are overlapped with two lens images (iK0, iK1, N=2)) for example. After the texture mapping engines 621~622 in the PC 120 texture map the texture data from the lens images iK0 and iK1 to generate two sample values s1 and s2, the blending unit 630 of the PC 120 blends the two sample values (s1, s2) together to generate a blended value Vb of point Q using the following equation: $Vb=fw_1*s1+fw_2*s2$. Finally, the blending unit 630 of the PC 120 stores the blended value Vb of point Q into its local VM 170. In this manner, the blending unit 630 of the PC 120 sequentially stores all the blended values Vb into its local VM 170 until all the points within the quadrilateral ABCD are processed/completed. Once all the quadrilaterals/triangles are processed, a face image F0 is stored in its local VM 170. In the same manner, the GPU 132 of the PC 121 generates a face image F1 in its local VM 171 according to its own lens image iK1, the leftmost quarter iK2' of its neighboring lens image iK2 and its modified vertex sub-list m1'; the GPU 132 of the PC 122 generates a face image F2 in its local VM 172 according to its own lens image iK2, the leftmost quarter iK3' of its neighboring lens image K3 and its modified vertex sub-list m2'; the GPU 132 of the PC 123 generates a face image F3 in its local VM 173 according to its own lens image iK3, the leftmost quarter iK0' of its neighboring lens image iK0 and its modified vertex sub-list m3'.

In step S412 (transmission stage 3), each GPU 132 in each PC (120~123) divides its own face image into multiple tiles with a predefined size, calculates histograms (Hl and Hr) of the leftmost and the rightmost columns of tiles of its own face image and transmits the histograms (Hl and Hr) and predefined segments of its face image to its neighboring PCs. In an embodiment, the predefined size of the tiles is 64×64 and the predefined segments of its face image are eight leftmost columns of pixels and eight rightmost columns of pixels of its own face image; however, the predefined size of the tiles and the predefined segments of the face image are provided by example, but not limitations of the invention. In actual implementations, any size of tiles and any number of columns of pixels of the face image can be used. As shown in FIG. 4A, the GPU 132 in the PC 123 transmits histograms Hr3 of the rightmost column of tiles and eight rightmost columns Fr3 of pixels of its face image F3 to the IQE unit 133 in the PC 120 via the output port 152 and transmits histograms Hl3 of the leftmost column of tiles and eight leftmost columns Fl3 of pixels of its face image F3 to the IQE unit 133 in the PC 122 via the output port 155. The IQE unit 133 in the PC 123 receives and parses MIPI packets containing the histograms Hl0 and Hr2 and the segments Fl0 and Fr2 from the PCs 120 & 122 via the input ports 153 and 154, and stores the histograms Hl0 and Hr2 and the segments Fl0 and Fr2 into its local VM 173 according to the data types (e.g., 0x32 for inbound histograms; 0x33 for inbound segments) of packet headers. The GPUs 132 and the IQE units 133 in the PCs 120~122 operate in the similar way to the GPU 132 and the IQE unit 133 in the PC 123.

In step S414, after receiving two histograms and two segments of two neighboring face images from two neighboring PCs, each IQE unit 133 in each PC (120~123) performs image quality enhancement (IQE) operations over its own face image. The IQE operations include, without limitation, contrast enhancement, lowpass filtering and image sharpness. The contrast enhancement can be implemented by using any known algorithms, such as contrast limited adaptive histogram equalization (CLAHE). For example, IQE unit 133 in the PC 123 performs IQE operations over its own face image F3 according to the histograms Hl0 and Hr2 and the segments Fl0 and Fr2 to generate an enhanced image F3'. The IQE units 133 in the PCs 120~122 operate in the similar way to the IQE unit 133 in the PCs 123.

After the step S414 is completed, the flow of FIG. 4C directly forwards to step S416 (hereinafter called "Approach 1"; the link 481 and the step S415 are eliminated); in step 416, the four encoding & transmitting units 134 respectively encode the four enhanced images F0'~F3' into four encoded video stream en0~en3, and then transmit the four encoded video streams en0~en3 to the receiver 180 for generation of a panoramic image. Alternatively, the flow goes through the step S415 and then enters step S416 as follows (hereinafter called "Approach 2"; the link 481 is needed). In step S415 (transmission stage 4), the image quality enhancement units 133 in the three auxiliary PCs 121~123 respectively transmit the enhanced image F1'~F3' to the encoding & transmitting unit 134 of the main PC 120 via the output ports 155,156 and 152; the encoding & transmitting unit 134 of the main PC 120 receives and parses MIPI packets containing the enhanced images F1'~F3' via the input ports 153, 157 and 154, and stores the enhanced images F1'~F3' in the local VM 170 according to the data types (e.g., 0x34 for inbound enhanced images) of packet headers. In step S416, the encoding & transmitting unit 134 of the main PC 120 merges the three enhanced images F1'~F3' into the main enhanced image F0' to form a single bit stream, encodes the single bit stream into a single encoded video stream en and transmits the single encoded video stream en to the receiver 180. For Approach 2, the encoding & transmitting unit 134 of the main PC 120 is needed while the encoding & transmitting units 134 of the AUX PCs 121~123 can be eliminated.

Please note that as set forth above, the IQE unit 133 in each PC and Approach 2 are optional, and thus the steps S412, S414 and S415 are also optional and represented by dashed lines in FIGS. 4B-4C. In a case that all the IQE units 133 are eliminated, after generating the face images F0-F3, the GPU 132s in the PCs 120~123 respectively transmit the face images F0-F3 to their corresponding encoding & transmitting units 134 for subsequent encoding and transmitting (Approach 1; the steps S412, S414 and S415 are eliminated); alternatively, the GPU 132s in the auxiliary PC 121~123 respectively transmit their face images F1-F3 to the encoding & transmitting unit 134 of the main PC 120 for encoding and transmitting (Approach 2; the steps S412 and S414 are eliminated while the step S415 is needed).

Figure 8:
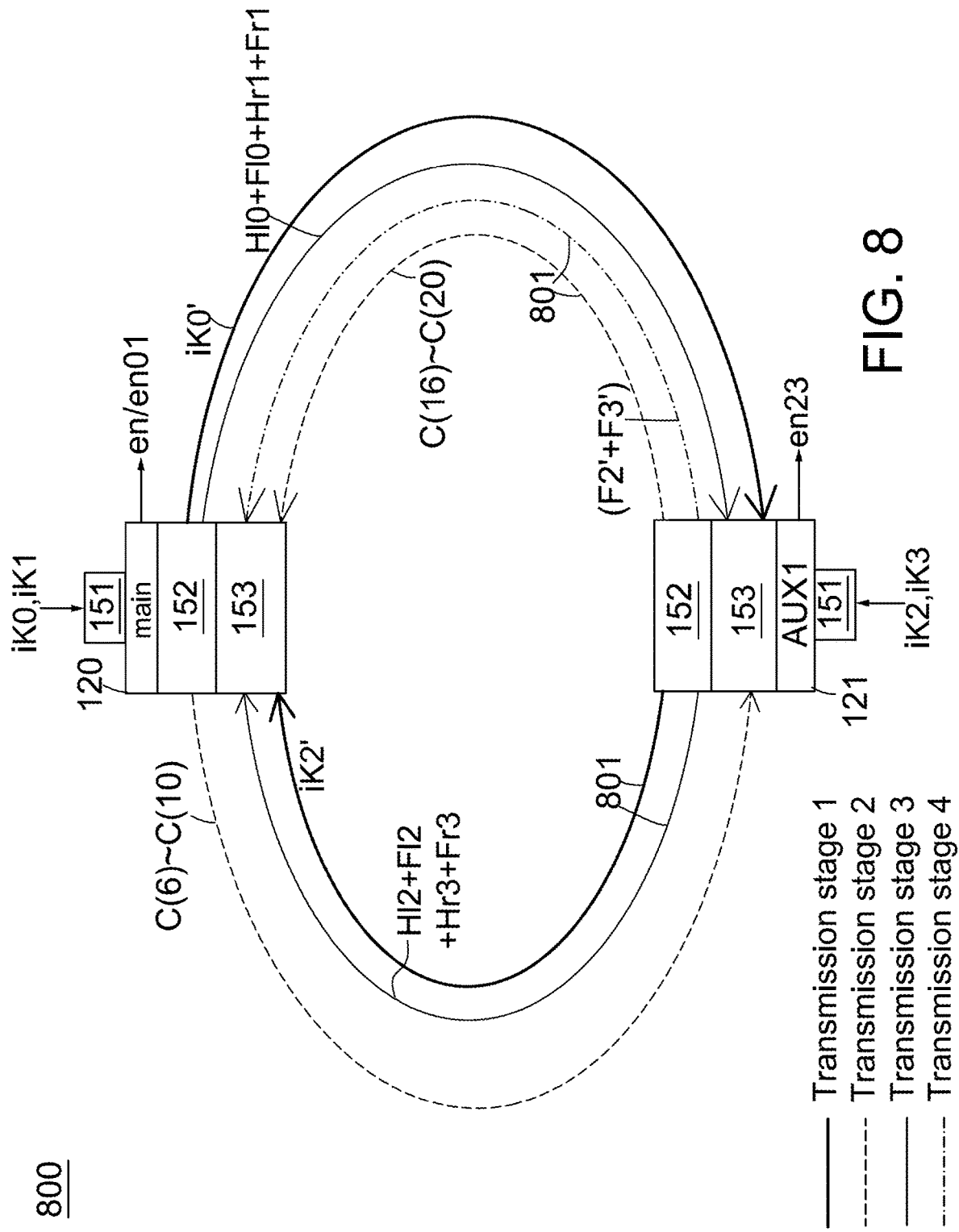
FIG. 8 is a block diagram of a two-processor system for a four-lens camera 110A according to an embodiment of the invention.

FIG. 8 is a block diagram of a two-processor system for a four-lens camera 110A according to an alternative embodiment of the invention. Referring to FIG. 8, the two-processor system 800 includes a main PC 120, an auxiliary PC 121 and four links for processing image data from the four lenses K0~K3 of the camera 110A. The PC 120 is conjected to the lenses K0 and K1 of the camera 110A via input port 151 while the PC 121 is conjected to the lenses K2 and K3 of the camera 110A via input port 151 as shown in FIGS. 1 and 8. For purpose of clarity and ease of description, only the main PC 120 and the auxiliary PC 121 with their I/O ports and four links are shown in FIG. 8 and will be described herein. In this embodiment, each PC 120/121 includes three I/O ports 151~153. In the offline phase, since the two-processor system 800 includes two PCs 120~121, the original vertex list (e.g., Table 1) is divided into an original main vertex sub-list or01 for the PC 120 and an original AUX vertex sub-lists or23 for the PC 121 according to the equirectangular coordinates, and the two original vertex sub-lists or01~or23 are stored into the two local NVMs 160 and 161 for subsequent image processing.

The operations of two-processor system 800 are described below in the order of the flow of FIGS. 4B-4C. In step S402, referring to FIGS. 4B-4C and 8, the ISP 131 of the PC 120 receives and parses MIPI packets containing electronic signals from image sensors associated with lenses K0 and K1 in the camera 110A via input port 151, transforms the electronic signals into two lens images iK0 and iK1 and stores the two lens images in its local VM 170 according to the data type (e.g., 0x2A) of the packet headers; the ISP 131 of the PC 121 operates in the similar way to the ISP 131 of the PC 120. Please note that each PC is responsible for two overlap regions in FIG. 3D. In an embodiment, the PC 120 obtains two lens images iK0~iK1 and is responsible for two overlap regions A(0) and A(3) while the PC 121 obtains two lens images iK2~iK3 and is responsible for two overlap regions A(1) and A(2). For purpose of clarity and ease of description, the following examples and embodiments are described with the assumption that the PC 120 obtains two lens images iK0~iK1 and is responsible for two overlap regions A(0) and A(1), and the PC 121 obtains two lens images iK2~iK3 and is responsible for two overlap regions A(2) and A(3).

In step S404 (transmission stage 1), to form the four overlap regions, each PC needs to transmit an outbound left edge data of its two lens images to the other PC via the output port 152, and receive left edge data of its neighboring two lens images from the other PC via the input port 153. For each PC, the outbound left edge data of its two lens images is located at an edge opposite to its two given/responsible overlap regions, and the right edge data of its two lens images and the inbound left edge data of its neighboring two lens images are used to form a corresponding overlap region and associated with the size of the corresponding overlap region; for example, edge data rK1' and iK2' form A(1) and the sizes of edge data rK1' and iK2' are associated with the size of A(1). As set forth above, as soon as the FOVs of the lenses, the resolutions of lens sensors and the lens angles arranged in the camera 110A are fixed, the sizes of the overlap regions A(0)~A(3) are determined. Hereinafter, it is assumed that the left edge data and the right edge data of its two lens images respectively refer to a leftmost quarter (i.e., H*W/4) of a left one of the two lens images and a rightmost quarter of a right one of the two lens images. Since the PC 120 obtains the two lens images iK0 and iK1 and is responsible for the overlap regions A(0) and A(1), the ISP 131 of the PC 120 needs to transmit a leftmost quarter K0' of the lens image iK0 to the PC 121 via output port 152, and the GPU 132 of the PC 120 receives and parses MIPI packets containing a leftmost quarter iK2' of its neighboring lens image iK2 from the ISP 131 of its neighboring PC 121 via input port 153 and stores the leftmost quarter iK2' into the local VM 170 according to the data type (e.g., 0x30 for inbound edge data) of packet headers so that the inbound leftmost quarter iK2' and the rightmost quarter rK1' of its two lens images iK0~iK1 form the overlap region A(1). The ISP 131 and the GPU 132 of the PC 121 operate in the similar way to the ISP 131 and the GPU 132 of the PC 120 do in step S404.

In step S406, according to the methods in FIG. 7A and FIG. 7B, the GPU 132 in the PC 120 forms its own 2D error table (e.g., Table 3) including different values (related to the offset ofs in FIG. 5A) of twenty test warping coefficients and ten region errors E(1)~E(10) of ten control regions R(1)~R(10) in the given/responsible overlap regions A(0) and A(1) to determine the optimal warping coefficients C(1)~C(10) of the ten control regions; the GPU 132 in the PC 121 forms its own 2D error table including the different values of the test warping coefficients and ten region errors E(11)~E(20) of ten control regions R(11)~R(20) in the given/responsible overlap regions A(2) and A(3) to determine the optimal warping coefficients C(11)~C(20) of the ten control regions.

In step S408 (transmission stage 2), the GPU 132 in the PC 120 transmits the optimal warping coefficients C(6)~C(10) of the five control regions R(6)~R(10) in its responsible overlap region A(1) to the PC 121 via output port 152, receives and parses MIPI packets containing the optimal warping coefficients C(16)~C(20) of the five control regions R(16)~R(20) from the GPU 132 in the PC 121 via input port 153 and stores the optimal warping coefficients C(16)~C(20) into the local VM 170 according to the data type (e.g., 0x31 for inbound optimal warping coefficients) of packet headers. The GPU 132 in the PC 121 operates in the similar way to the GPU 132 in the PC 120.

In step S409, the GPU 132 in the main PC 120 modify all the texture coordinates in the two lens images iK0~iK1 for each vertex from the original vertex sub-lists or01 according to the optimal warping coefficients C(1)~C(10) and C(16)~C(20) to generate a modified main vertex sub-list m01', the GPU 132 in the AUX PC 121 modify all the texture coordinates in the two lens images iK2~iK3 for each vertex from the original AUX vertex sub-lists or23 according to the optimal warping coefficients C(6)~C(20) to generate a modified AUX vertex sub-list m23'. In step S410, the rasterization engine 610, the texture mapping circuit 620 and the blending unit 630 in the main PC 120 operate together to generate two face images F0 and F1 in FIG. 3D according to the two lens images iK0, iK1, a leftmost quarter iK2', and the modified main vertex sub-list m01', the rasterization engine 610, the texture mapping circuit 620 and the blending unit 630 in the AUX PC 121 operate together to generate two face images F2 and F3 according to the two lens images iK2, iK3, a leftmost quarter iK0', and the modified AUX vertex sub-list m23'.

In step S412 (transmission stage 3), each GPU 132 in each PC (120~121) divides each face image into multiple tiles (e.g., having a size of 64×64) and calculates histograms Hl of the leftmost column of tiles and histograms Hr of the rightmost column of tiles of its two face images. The GPU 132 in the PC 120 transmits histograms Hr1 of the rightmost column of tiles and a predefined segment (e.g., eight rightmost columns of pixels) Fr1 in the right face image F1 and histograms Hl0 of the leftmost column of tiles and a predefined segment (e.g., eight leftmost columns of pixels) Fl0 of the left face image F0 via output port 152 to the IQE unit 133 in the PC 121. The IQE unit 133 in the PC 120 receives and parses MIPI packets containing the histograms Hl2 and Hr3 and the segments Fl2 and Fr3 via the input port 153, and stores the histograms Hl2 and Hr3 and the segments Fl2 and Fr3 into its local VM 170 according to the data types (e.g., 0x32 for inbound histograms; 0x33 for inbound segments) of packet headers. The GPU 132 and the IQE unit 133 in the PC 121 operate in the similar way to the GPU 132 and the IQE unit 133 in the PC 120.

In step S414, the IQE unit 133 in the PC 120 performs IQE operations over the two face images F0 and F1 according to the histograms Hl2 and Hr3 and the segments Fl2 and Fr3 to generate two enhanced images F0' and F1'. The IQE unit 133 in the PC 121 performs IQE operations over the two face images F2 and F3 according to the histograms Hl0 and Hr1 and the segments Fl0 and Fr1 to generate two enhanced image F2' and F3'.

For Approach 1, in step 416, the encoding & transmitting units 134 in the PCs 120~121 respectively encode the four enhanced images F0'~F3' into two encoded video streams en01 and en23, and then transmit the two encoded video streams en01 and en23 to the receiver 180 for generation of a panoramic image. For Approach 2, in step S415 (transmission stage 4), the image quality enhancement unit 133 in the auxiliary PC 121 sends the two enhanced images F2'~F3' to the encoding & transmitting unit 134 of the main PC 120 via the output port 152; next, in step S416, the encoding & transmitting unit 134 of the main PC 120 receives and parses MIPI packets containing the two enhanced images F2'~F3' via the input port 153, stores the enhanced images F2'~F3' in the local VM 170 according to the data types (e.g., 0x34 for inbound enhanced images) of packet headers, merges the two enhanced images F2'~F3' into the two enhanced images F0'~F1' to form a single bit stream, encodes the single bit stream into a single encoded video stream en and transmits the single encoded video stream en to the receiver 180.

Figure 9A:
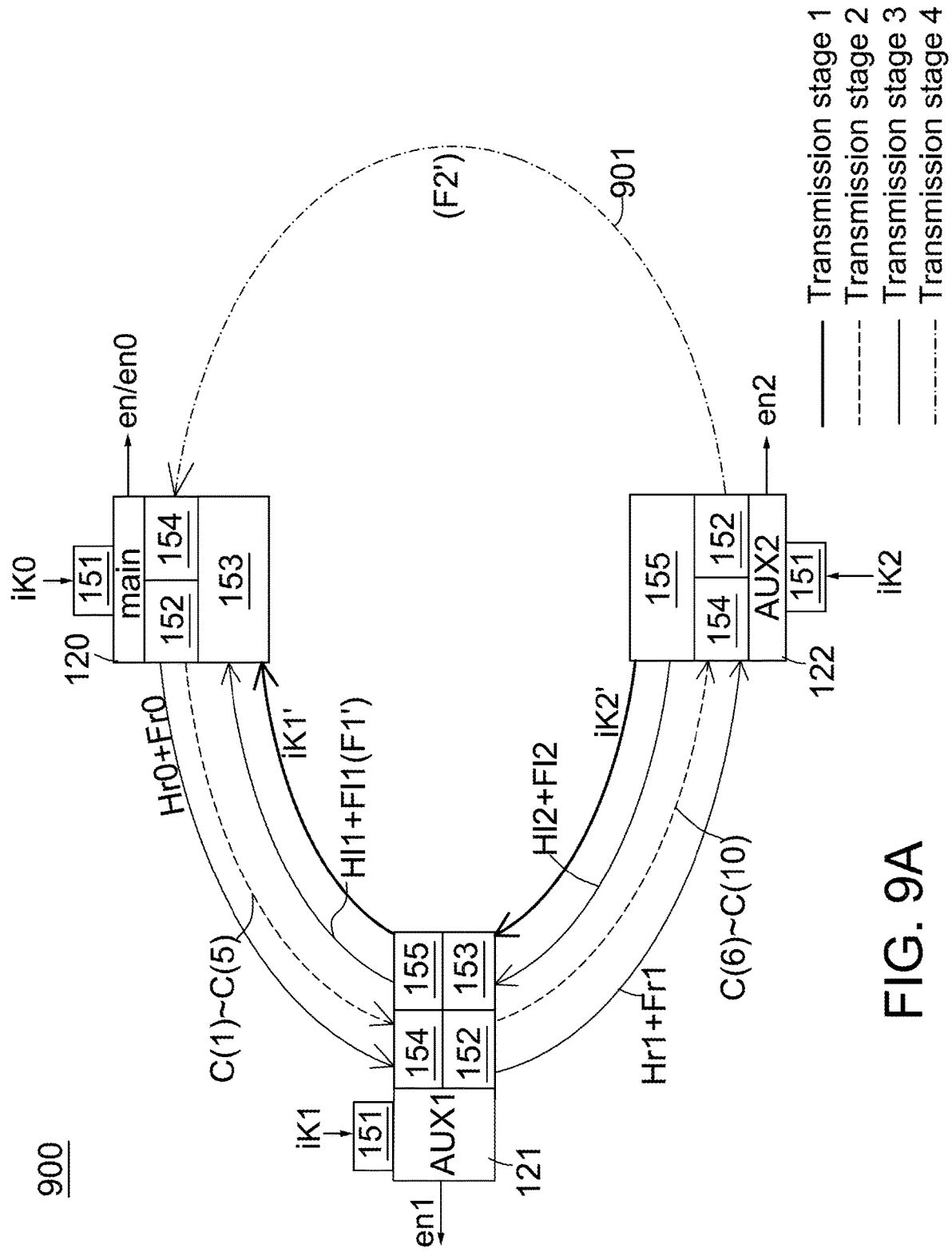
FIG. 9A is a block diagram of a three-processor system for a three-lens camera 110B according to an embodiment of the invention.
Figure 9B:
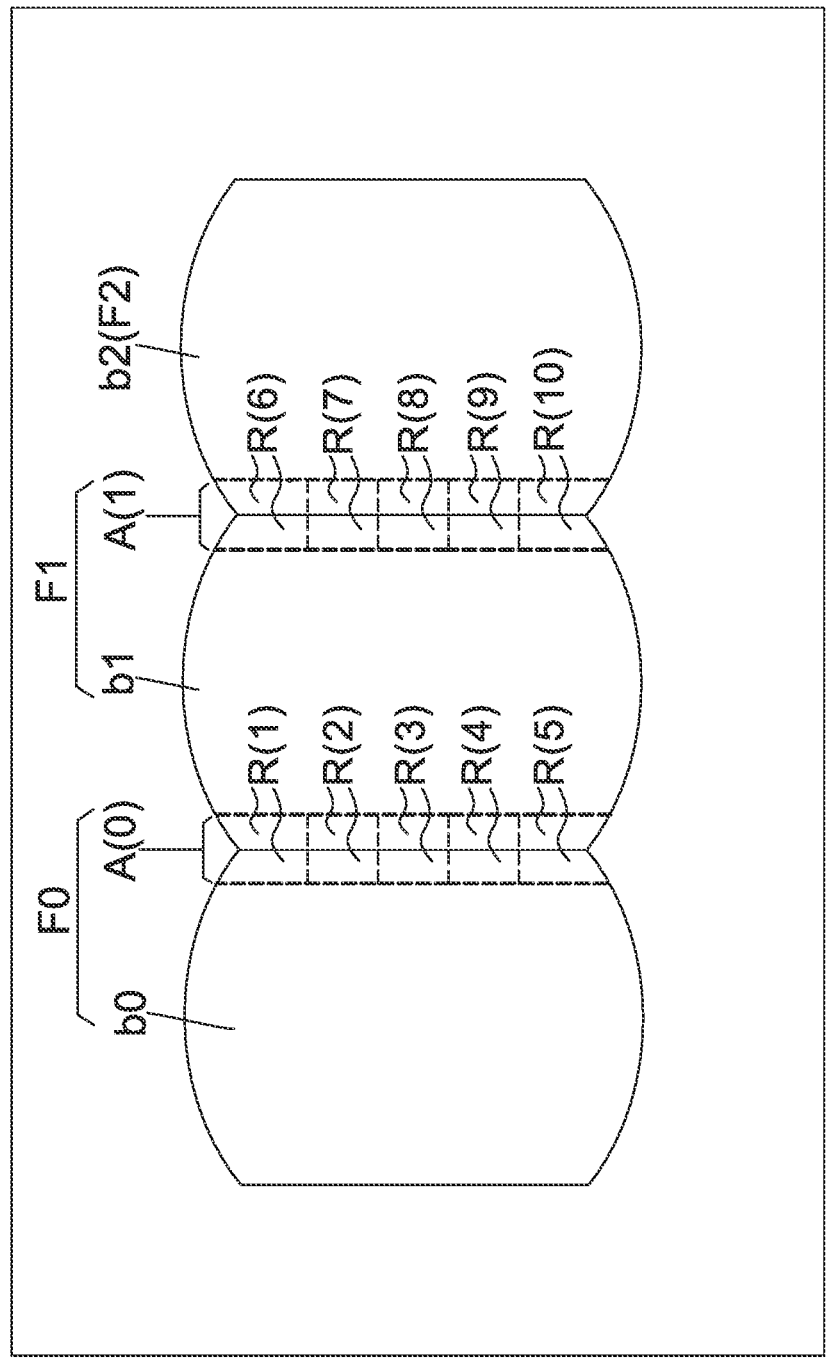
FIG. 9B shows an exemplary wide-angle image two overlap regions A(0)~A(1) containing ten control regions R(1)~R(10).

FIG. 9A is a block diagram of a three-processor system for a three-lens camera 110B according to an embodiment of the invention. Please note that the three-processor system 900 is configured to generate three face images for a wide-angle image as shown in FIG. 9B while the four-processor system 400 and the two-processor system 800 are configured to generate four face images for a panoramic image as shown in FIG. 3D. Referring to FIG. 9A, the three-processor system 900 for processing three lens images iK0~iK2 from the three-lens camera 110B includes a main PC 120, two auxiliary PCs 121~122 and five links, wherein the link 901 is optional. For purpose of clarity and ease of description, only the main PC 120 and the two auxiliary PCs 121~122 with their I/O ports and the five links are shown in FIG. 9A and will be described herein. In this embodiment, each PC 120/122 includes four I/O ports while the PC 121 includes five I/O ports 151~155. In the offline phase, since the three-processor system 900 includes three PCs 120~122, the original vertex list (Table 1) is divided into an original main vertex sub-list on) for the main PCs 120 and two original AUX vertex sub-lists or1~or2 for the PCs 121~122 according to the equirectangular coordinates, and the three original vertex sub-lists or0~or2 are stored into the three local NVMs 160~162 for subsequent image processing.

The operations of three-processor system 900 are described below in order of the flow of FIGS. 4B-4C. In step S402, the ISPs 131 in the three-processor system 900 respectively obtain three lens images iK0~iK2 in the similar way to the ISPs 131 in the four-processor system 400. In an embodiment, the PC 121 is responsible for overlap region A(0) and the PC 122 is responsible for overlap region A(1), but the PC 120 is "not" responsible for any overlap region. For purpose of clarity and ease of description, the following examples and embodiments are described with the assumption that the PC 120 is responsible for overlap region A(0), the PC 121 is responsible for overlap region A(1), but the PC 122 is "not" responsible for any overlap region.

In step S404 (transmission stage 1), to form the two overlap regions, the ISP 131 of the PC 121 transmits outbound left edge data (e.g., a leftmost quarter iK1') of its own lens image iK1 to the PC 120 via the output port 155; the GPU 132 of the PC 121 receives and parses MIPI packets containing left edge data (e.g., a leftmost quarter iK2') of its right neighboring lens image iK2 from its neighboring PC 122 via the input port 153, and stores the leftmost quarter iK2' into the local VM 171 according to the data type (e.g., 0x30 for inbound edge data) of packet headers so that the leftmost quarter iK2' and the rightmost quarter rK1' of its own lens image iK1 form the overlap region A(1). Since the PC 120 obtains the lens image iK0 and is responsible for the overlap region A(0), the GPU 132 of the PC 120 receives and parses MIPI packets containing a leftmost quarter iK1' of its neighboring lens image iK1 from the ISP 131 of its neighboring PC 121 via the input port 153 and stores the leftmost quarter iK1' into the local VM 170 so that the leftmost quarter iK1' and the rightmost quarter rK0' of its own lens image iK0 form the overlap region A(0). Since the PC 122 obtains the lens image iK2 and is "not" responsible for any overlap region, the ISP 131 of the PC 122 only transmits a leftmost quarter iK2' of the lens image iK2 to the GPU 132 of the PC 121 via the output port 155.

In step S406, according to the methods in FIGS. 7A and 7B, the GPU 132 in the PC 120 forms its own 2D error table (e.g., Table 3) including different values (related to the offset ofs in FIG. 5A) of ten test warping coefficients and five region errors E(1)~E(5) of five control regions R(1)~R(5) in its responsible overlap region A(0) to determine the five optimal warping coefficients C(1)~C(5) of the five control regions R(1)~R(5), the GPU 132 in the PC 121 forms its own 2D error table including the different values of the test warping coefficients and five region errors E(6)~E(10) of five control regions R(6)~R(10) in its responsible overlap region A(1) to determine the five optimal warping coefficients C(6)~C(10) of the five control regions R(6)~R(10).

In step S408 (transmission stage 2), the GPU 132 in the PC 120 transmits the optimal warping coefficients C(1)~C(5) of the five control regions R(1)~R(5) in its responsible overlap region A(0) to the PC 121 via the output port 152. The GPU 132 in the PC 121 transmits the optimal warping coefficients C(6)~C(10) of the five control regions R(6)~R(10) in its responsible overlap region A(1) to the PC 122 via the output port 152, and receives and parses MIPI packets containing the optimal warping coefficients C(1)~C(5) from the PC 120 via input port 154 and stores the optimal warping coefficients C(1)~C(5) into the local VM 171 according to the data type (e.g., 0x31) of packet headers. The GPU 132 in the PC 122 receives and parses MIPI packets containing the optimal warping coefficients C(6)~C(10) from the PC 121 via the input port 154, and stores the optimal warping coefficients C(6)~C(10) into the local VM 172 according to the data type of packet headers.

In step S409, the GPU 132 in the main PC 120 modifies all the texture coordinates in the lens image iK0 for each vertex from the original vertex sub-list or0 according to the five optimal warping coefficients C(1)~C(5) to generate a modified main vertex sub-list m0', the GPU 132 in the AUX PC 121 modifies all the texture coordinates in the lens image iK1 for each vertex from the original AUX vertex sub-lists or1 according to the ten optimal warping coefficients C(1)~C(10) to generate a modified AUX vertex sub-list m1'; the GPU 132 in the AUX PC 122 modifies all the texture coordinates in the lens image iK2 for each vertex from the original AUX vertex sub-lists or2 according to the five optimal warping coefficients C(6)~C(10) to generate a modified AUX vertex sub-list m2'. In step S410, the rasterization engine 610, the texture mapping circuit 620 and the blending unit 630 in the main PC 120 operate together to generate a face image F0 in FIG. 9B according to the lens image iK0, the inbound leftmost quarter iK1' and the modified main vertex sub-list m0', the rasterization engine 610, the texture mapping circuit 620 and the blending unit 630 in the AUX PC 121 operate together to generate the face image F1 in FIG. 9B according to the lens image iK1, the inbound leftmost quarter iK2' and the modified AUX vertex sub-list m1'; the rasterization engine 610, the texture mapping circuit 620 and the blending unit 630 in the AUX PC 122 operate together to generate the face image F2 in FIG. 9B according to the lens image iK2 and the modified AUX vertex sub-list m2'.

In step S412 (transmission stage 3), each GPU 132 in each PC (120~122) divides each face image into multiple tiles (e.g., having a size of 64×64), calculates histograms Hl of the leftmost column of tiles or/and histograms Hr of the rightmost column of tiles of its face image, and transmits the histograms (Hl and/or Hr) and a predefined segment of its face image to one or two neighboring PCs. In an embodiment, the predefined segment of its face image is eight leftmost columns of pixels and/or the eight rightmost columns of pixels of its face image. As shown in FIG. 9A, the GPU 132 in the PC 120 transmits histograms Hr0 of the rightmost column of tiles and eight rightmost columns Fr0 of pixels of its face image F0 via the output port 152 to the IQE unit 133 in the PC 121, receives and parses MIPI packets containing the histogram Hl1 of the leftmost column of tiles and eight leftmost columns Fl1 of pixels of the neighboring face image F1 via the input port 153, and stores the histograms Hl1 and the segment Fl1 into its local VM 170 according to the data types of packet headers; the GPU 132 in the PC 121 transmits histograms Hr1 of the rightmost column of tiles and eight rightmost columns Fr1 of pixels of the face image F1 via the output port 152 to the IQE unit 133 in the PC 122, transmits histograms Hl1 of the leftmost column of tiles and eight leftmost columns Fl1 of pixels of the face image F1 via the output port 155 to the IQE unit 133 in the PC 120, receives and parses MIPI packets containing the histogram Hl2 of the leftmost column of tiles and eight leftmost columns Fl2 of pixels of the neighboring face image F2 via the input port 153 and containing the histogram Hr0 and the segment Fr0 via the input port 154, and stores the histograms Hl2 and Hr0 and the segments Fl2 and Fr0 into its local VM 171 according to the data types of packet headers. The GPU 132 in the PC 122 transmits histograms Hl2 of the leftmost column of tiles and eight leftmost columns Fl2 of pixels of the face image F2 via the output port 155 to the IQE unit 133 in the PC 121, receives and parses MIPI packets containing the histograms Hr1 and the segment Fr1 from the PC 121 via the input port 154, and stores the histograms Hr1 and the segment Fr1 into its local VM 172 according to the data types of packet headers.

In step S414, the IQE unit 133 in the PC 120 performs IQE operations over the face image F0 according to the histograms Hl1 and the segment Fl1 to generate an enhanced images F0', IQE unit 133 in the PC 121 performs IQE operations over the face image F1 according to the histograms Hr0 and Hl2 and the segment Fr0 and Fl2 to generate an enhanced image Ft; the IQE unit 133 in the PC 122 performs IQE operations over the face image F2 according to the histograms Hr1 and the segment Fr1 to generate an enhanced images F2'. For Approach 1 (without the link 901), in step 416, the encoding & transmitting units 134 in the PCs 120~122 respectively encode the three enhanced images F0'~F2' into three encoded video streams en0~en2, and then transmit the three encoded video streams en0~en2 to the receiver 180 for generation of a wide-angle image. For Approach 2 (with the link 901), in step S415 (transmission stage 4), the IQE units 133 in the auxiliary PCs 121~122 respectively send the two enhanced image F1'~F2' to the encoding & transmitting unit 134 of the main PC 120 via the output ports 155 and 152; next, in step S416, the encoding & transmitting unit 134 of the main PC 120 receives and parses MIPI packets containing the enhanced images F1'~F2' via the input ports 153~154, stores the enhanced images F1'~F2' in the local VM 170 according to the data types (e.g., 0x34) of packet headers, merges the two enhanced images F1'~F2' into the enhanced images F0' to form a single bit stream, encodes the single bit stream into a single encoded video stream en and transmits the single encoded video stream en to the receiver 180.

Please note that since the multiple-processor system 400/800 is configured to generate face images for a panoramic image, the multiple PCs are conjected in a ring topology in transmission stage 1~3. For the multiple-processor system 400, the multiple PCs are conjected in a unidirectional ring topology in transmission stage 1~2 while the multiple PCs are conjected in a bidirectional ring topology in transmission stage 3. In contrast, since the three-processor system 900 is configured to generate face images for a wide-angle image, the multiple PCs are conjected in a linear topology in transmission stage 1~3; in particular, the multiple PCs are conjected in a unidirectional linear topology in transmission stage 1~2 while the multiple PCs are conjected in a bidirectional linear topology in transmission stage 3. The directions of data transfers across the PCs in transmission stage 1 and 2 are opposite.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A multiple-processor system, comprising:
   multiple processor components (PCs) coupled to a multiple-lens camera that captures a X-degree horizontal field of view and a Y-degree vertical field of view, each PC comprises:
      multiple I/O ports; and
      a processing unit coupled to the I/O ports; and
   multiple links, each link conjecting one of the I/O ports of one of the PCs to one of the I/O ports of another one of the PCs such that each PC is conjected by two or more respective links to one or two neighboring PCs, each link being configured to transfer data in one direction, where X<=360 and Y<180;
   wherein a processing unit j comprises:
      an image signal processor (ISP) configured to obtain $n_j$ lens images captured by the multiple-lens camera and selectively transmit outbound first edge data associated with the $n_j$ lens images and zero or more responsible overlap regions to one neighboring PC; and
      a graphics processing unit (GPU) coupled to the ISP and configured to perform a set of operations comprising: (1) selectively receiving inbound first edge data from the other neighboring PC, (2) determining optimal warping coefficients for responsible control regions in the responsible overlap regions according to a first vertex sub-list, the $n_j$ lens images and the inbound first edge data, (3) selectively transceiving inbound and outbound warping coefficients to and from the one or two neighboring PCs, and (4) rendering $n_j$ face images according to the first vertex sub-list, the optimal and the inbound warping coefficients, the inbound first edge data and the $n_j$ lens images, where $n_j>=1$;
      wherein the outbound warping coefficients are selected from the optimal warping coefficients according to the responsible control regions, and the first vertex sub-list comprises multiple first vertices with first data structures that define a first vertex mapping between the $n_j$ lens images and a projection image related to all the face images from all the PCs.

2. The system according to claim 1, wherein the PCs are conjected in a ring topology if the projection image is a panoramic image and the PCs are conjected in a linear topology if the projection image is a wide-angle image.

3. The system according to claim 1, wherein the outbound first edge data are located at a first edge of the $n_j$ lens images, and the responsible control regions having the outbound warping coefficients are located at a second edge of the $n_j$ lens images, wherein the second edge is opposite to the first edge.

4. The system according to claim 1, wherein a size of the outbound first edge data is related to a size of each overlap region, and wherein the size of each overlap region is varied according to field of views of the lenses, resolutions of lens sensors and lens angles arranged in the multiple-lens camera.

5. The system according to claim 1, wherein the processing unit j further comprises:
   an encoding and transmitting unit configured to encode the $n_j$ face images into an encoded stream and transmit the encoded stream.

6. The system according to claim 1, wherein the PCs comprise a main PC and at least one auxiliary PC, and each auxiliary PC is further conjected to the main PC by one of the links, wherein the GPU in each auxiliary PC is further configured to transmit at least one face image to the main PC, and wherein the processing unit of the main PC further comprises:
   an encoding and transmitting unit configured to receive at least one inbound face image from the at least one auxiliary PC, encode the at least one inbound face image and at least one face image from the GPU of the main PC into a single encoded stream and transmit the single encoded stream.

7. The system according to claim 1, wherein the set of operations further comprises: selectively transmitting outbound second edge data and outbound histograms of tiles selected from the $n_j$ face images to the one or two neighboring PCs, wherein the processing unit j further comprises:
   an image quality enhancement (IQE) unit configured to receive the inbound second edge data and the inbound histograms of tiles from the one or two neighboring PCs, and perform image quality enhancement over the $n_j$ face images based on the inbound second edge data and the inbound histograms of tiles to generate $n_j$ enhanced images;
   wherein the outbound second edge data are located at one or both of the leftmost and the rightmost edges of the $n_j$ face images, and the outbound histograms of tiles comprise histograms of tiles at one or both of the leftmost and the rightmost edges of the $n_j$ face images.

8. The system according to claim 7, wherein the processing unit j further comprises:
   an encoding and transmitting unit coupled to the IQE unit and configured to encode the $n_j$ enhanced images into an encoded stream and transmit the encoded stream.

9. The system according to claim 7, wherein the PCs comprise a main PC and at least one auxiliary PC, and each auxiliary PC is further connected to the main PC by one of the links, wherein the IQE unit in each auxiliary PC is further configured to transmit at least one enhanced image to the main PC, and wherein the processing unit of the main PC further comprises:
   an encoding and transmitting unit configured to receive at least one inbound enhanced image from the at least one auxiliary PC, encode the at least one inbound enhanced image and at least one enhanced image from the GPU of the main PC into a single encoded stream and transmit the single encoded stream.

10. The system according to claim 1, wherein the operation of (2) determining the optimal warping coefficients comprises:
    determining multiple test warping coefficients according to an offset of a lens center relative to a system center in the multiple-lens camera;
    modifying texture coordinates of each lens image for all the first vertices in the first vertex sub-list to generate a second vertex sub-list according to the test warping coefficients;

forming a 2D error table comprising different values of the test warping coefficients and corresponding multiple accumulation pixel value differences in the responsible control regions according to the second vertex sub-list, the $n_j$ lens images and the inbound first edge data; and determining the optimal warping coefficient of each responsible control region according to at least one local minimum among the accumulation pixel value differences of one or two closest control regions relative to the responsible control region in the 2D error table;

wherein the second vertex sub-list comprises the second vertices with second data structures that define a second vertex mapping between the $n_j$ lens images and the projection image.

11. The system according to claim 1, wherein the operation of (4) rendering the $n_j$ face images comprises:

modifying texture coordinates of each lens image for all the first vertices in the first vertex sub-list to generate a third vertex sub-list according to the optimal warping coefficients and the inbound warping coefficients; and performing rasterization, texture mapping and blending operations for each point within each polygon formed by each group of third vertices from the third vertex sub-list to generate the $n_j$ face images according to the inbound first edge data and the $n_j$ lens images;

wherein the third vertex sub-list comprises the third vertices with third data structures that define a third vertex mapping between the $n_j$ lens images and the projection image.

12. The system according to claim 1, wherein each face image is derived from a predefined projection of a corresponding lens image from the multiple-lens camera.

13. The system according to claim 12, wherein the predefined projection is one of equirectangular projection, cylindrical projection, Miller projection, Mercator projection, Lambert cylindrical equal area projection and Pannini projection.

14. The system according to claim 1, wherein each overlap region comprises P1 control regions arranged in one column, where P1>=3.

15. An image processing method, applied to a multiple-processor system for a multiple-lens camera that captures a X-degree horizontal field of view and a Y-degree vertical field of view, the multiple-processor system comprising multiple processor components (PCs) and multiple links, each PC is connected by two or more respective links to one or two neighboring PCs, each link being configured to transfer data in one direction, the method comprising:

at a PC j, obtaining $n_j$ lens images captured by the multiple-lens camera;

selectively transceive inbound and outbound first edge data associated with the $n_j$ lens images and zero or more responsible overlap regions to and from the one or two neighboring PCs in a first transmission stage;

determining optimal warping coefficients for responsible control regions in the responsible overlap regions according to a first vertex sub-list, the $n_j$ lens images and the inbound first edge data;

selectively transceiving inbound and outbound warping coefficients to and from the one or two neighboring PCs in a second transmission stage; and rendering $n_j$ face images according to the first vertex sub-list, the optimal and the inbound warping coefficients, the inbound first edge data and the $n_j$ lens images, where $n_j>=1$, X<=360 and Y<180;

wherein the outbound warping coefficients are selected from the optimal warping coefficients according to the responsible control regions, and the first vertex sub-list comprises multiple first vertices with first data structures that define a first vertex mapping between the $n_j$ lens images and a projection image related to the face images from all the PCs.

16. The method according to claim 15, wherein the outbound first edge data are located at a first edge of the $n_j$ lens images, and the responsible control regions having the outbound warping coefficients are located at a second edge of the $n_j$ lens images, wherein the second edge is opposite to the first edge.

17. The method according to claim 15, wherein a size of the outbound first edge data is related to a size of each overlap region, and wherein the size of each overlap region is varied according to field of views of the lenses, resolutions of lens sensors and lens angles arranged in the multiple-lens camera.

18. The method according to claim 15, further comprising:

at the PC j,
encoding the $n_j$ face images into an encoded stream; and
transmitting the encoded stream.

19. The method according to claim 15, further comprising:

at each of at least one auxiliary PC,
transmitting at least one face image to a main PC;
at the main PC,
receiving at least one inbound face image from the at least one auxiliary PC;
encoding the at least one inbound face image and at least one face image generated by the main PC into a single encoded stream; and
transmitting the single encoded stream;
wherein the PCs comprise the main PC and the at least one auxiliary PC, and each auxiliary PC is further connected to the main PC by one of the links.

20. The method according to claim 15, wherein directions of data transfers across the PCs in the first and the second transmission stage are opposite.

21. The method according to claim 15, further comprising:

at the PC j,
selectively transceiving outbound and inbound second edge data and outbound and inbound histograms of tiles to and from the one or two neighboring PCs; and
performing image quality enhancement over the $n_j$ face images based on the inbound second edge data and the inbound histograms of tiles to generate $n_j$ enhanced images;
wherein the outbound second edge data are located at one or both of the leftmost and the rightmost edges of the $n_j$ face images, and the outbound histograms of tiles comprises histograms of tiles at one or both of the leftmost and the rightmost edges of the $n_j$ face images.

22. The method according to claim 21, further comprising:

at the PC j,
encoding the $n_j$ enhanced images into an encoded stream; and
transmitting the encoded stream.

23. The method according to claim 21, further comprising:
- at each of at least one auxiliary PC,
  - transmitting at least one enhanced image to a main PC;
- at the main PC,
  - receiving at least one inbound enhanced image from the at least one auxiliary PC;
  - encoding the at least one inbound enhanced image and at least one enhanced image from the main PC into a single encoded stream; and
  - transmitting the single encoded stream;
- wherein the PCs comprise the main PC and the at least one auxiliary PC, and each auxiliary PC is further connected to the main PC by one of the links.

24. The method according to claim 15, wherein the step of determining the optimal warping coefficients comprises:
- determining multiple test warping coefficients according to an offset of a lens center relative to a system center in the multiple-lens camera;
- modifying texture coordinates of each lens image for all the first vertices in the first vertex sub-list to generate a second vertex sub-list according to the test warping coefficients;
- forming a 2D error table comprising different values of the multiple test warping coefficients and corresponding multiple accumulation pixel value differences in the responsible control regions according to the second vertex sub-list, the $n_j$ lens images and the inbound first edge data; and
- determining the optimal warping coefficient of each responsible control region according to at least one local minimum among the accumulation pixel value differences of one or two closest control regions of the responsible control region in the 2D error table;
- wherein the second vertex sub-list comprises the second vertices with second data structures that define a second vertex mapping between the $n_j$ lens images and the projection image.

25. The method according to claim 15, wherein the step of rendering the $n_j$ face images comprises:
- modifying texture coordinates of each lens image for all the first vertices in the first vertex sub-list to generate a third vertex sub-list according to the optimal warping coefficients and the inbound warping coefficients; and
- performing rasterization, texture mapping and blending operations for each point within each polygon formed by each group of third vertices from the third vertex sub-list to generate the $n_j$ face images according to the inbound first edge data and the $n_j$ lens images;
- wherein the third vertex sub-list comprises the third vertices with third data structures that define a third vertex mapping between the $n_j$ lens images and the projection image.

26. The method according to claim 15, wherein each overlap region comprises P1 control regions arranged in one column, where P1>=3.

27. The method according to claim 15, wherein the projection image is one of a panoramic image and a wide-angle image.

* * * * *